US009237494B2

(12) United States Patent
Sashihara et al.

(10) Patent No.: US 9,237,494 B2
(45) Date of Patent: Jan. 12, 2016

(54) HANDOVER CONTROL METHOD, CONTROL APPARATUS, ADJUSTMENT APPARATUS, AND NON-TRANSITORY COMPUTER READABLE MEDIUM

(75) Inventors: Toshiyuki Sashihara, Tokyo (JP); Kojiro Hamabe, Tokyo (JP); Yasuhiko Matsunaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 13/997,030

(22) PCT Filed: Sep. 7, 2011

(86) PCT No.: PCT/JP2011/005003
§ 371 (c)(1),
(2), (4) Date: Jun. 21, 2013

(87) PCT Pub. No.: WO2012/090357
PCT Pub. Date: Jul. 5, 2012

(65) Prior Publication Data
US 2013/0273919 A1      Oct. 17, 2013

(30) Foreign Application Priority Data

Dec. 28, 2010   (JP) ................................. 2010-291498

(51) Int. Cl.
*H04W 36/00* (2009.01)
*H04W 36/30* (2009.01)
*H04W 36/38* (2009.01)

(52) U.S. Cl.
CPC .......... *H04W 36/0094* (2013.01); *H04W 36/30* (2013.01); *H04W 36/38* (2013.01)

(58) Field of Classification Search
CPC ............ H04W 36/0083; H04W 36/30; H04W 36/0005; H04W 36/02; H04W 36/28; H04W 36/245; H04W 72/085; H04W 36/36; H04W 36/14; H04W 36/32; H04W 36/26; H04W 36/22; H04W 36/0033; H04W 36/0088; H04W 36/0094; H04W 36/38; H04W 36/385
See application file for complete search history.

(56) References Cited

U.S. PATENT DOCUMENTS 8,060,095 B1 *  11/2011  Gerami .......................... 455/437
8,576,797 B2 *  11/2013  Jang et al. ............. H04W 36/02
                                                              370/331

(Continued)

FOREIGN PATENT DOCUMENTS

CN    101841835 A    9/2010
CN    101854684 A    10/2010

(Continued)

OTHER PUBLICATIONS

Samsung, "Mobility support to pico cells in the co-channel HetNet deployment", 3GPP Contribution, R2-104017, Jun. 28, 2010 to Jul. 2, 2010, Stockholm, Sweden.

(Continued)

*Primary Examiner* — Liton Miah

(57) ABSTRACT

A method of controlling handover of a mobile station (5) from a first cell (61) to a second cell (62) includes adjusting a handover parameter so that, when radio quality of the first cell (61) at a position of a mobile station (5) is a first level, lag time from when a handover initiation condition is satisfied to when the handover is initiated is shorter than when the radio quality of the first cell is a second level that is higher than the first level. As a result, for example in HCS (HetNet), handover failures and ping-pong/rapid handovers can be reduced, and a mobile station expected to stay in a small-scale cell for at least a certain period of time can be efficiently accommodated in a small-scale cell.

32 Claims, 19 Drawing Sheets

(56) References Cited

U.S. PATENT DOCUMENTS

| | | | |
|---|---|---|---|
| 8,588,781 B2* | 11/2013 | Belschner et al. | H04W 36/0083 455/436 |
| 8,750,872 B2* | 6/2014 | Kim | H04W 36/24 370/331 |
| 2009/0323638 A1* | 12/2009 | Catovic et al. | 370/331 |
| 2010/0142486 A1* | 6/2010 | Wahlqvist et al. | 370/332 |
| 2010/0273487 A1* | 10/2010 | Alonso-Rubio et al. | 455/436 |

FOREIGN PATENT DOCUMENTS

| | | |
|---|---|---|
| JP | 2002-44702 A | 2/2002 |
| JP | 2010-501132 A | 1/2010 |
| WO | 2005/057975 A1 | 6/2005 |
| WO | 2010/002926 A1 | 1/2010 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331, V9.5.0, Dec. 2010, p. 65-81.

International Search Report for PCT Application No. PCT/JP2011/005003 mailed on Oct. 18, 2011.

Chinese Office Action for CN Application No. 201180063529.2 issued on Jul. 28, 2015 with English Translation.

* cited by examiner

HANDOVER CONTROL METHOD, CONTROL APPARATUS, ADJUSTMENT APPARATUS, AND NON-TRANSITORY COMPUTER READABLE MEDIUM

This application is a National Stage Entry of PCT/JP2011/005003 filed Sep. 7, 2011, which claims priority from Japanese Patent Application 2010-291498 filed Dec. 28, 2010, the contents of all of which are incorporated herein by reference, in their entirety.

TECHNICAL FIELD

The present invention relates to control of handover in cellular radio communications.

BACKGROUND ART

In various systems, TTT (Time to Trigger) is used to adjust a lag time from when a condition for state transition from one operating state to another operating state is satisfied to when the state transition is actually initiated. TTT is also called hold time or guard time in some cases. In general, TTT is used applied to determination of a period during which a state transition condition need to be kept satisfied. Specifically, when a state transition condition continues to be satisfied for a longer time than TTT, state transition is actually initiated. Therefore, a state transition is less likely to occur as TTT is longer. By adopting hysteresis using TTT, it is possible to prevent ping-pong phenomenon where state transitions between two operating states repeat frequently.

In cellular radio communications, TTT is used as one of handover control parameters (which are referred to hereinafter as handover (HO) parameters) in order to prevent handover failure of a mobile station, repetition of handover in a short period between adjacent cells (i.e., ping-pong handover), and handover to another cell after a short-time stay (i.e., rapid handover). A handover is a change of connection of a mobile station communicating with a serving cell to a neighbour cell. In the case of UTRAN (UMTS Terrestrial Radio Access Network), for example, "communicating" means the state (CELL_DCH state) where an individual channel (i.e., Dedicated Channel (DCH)) is satisfied between a base station and a mobile station or between a radio network controller (RNC) and a mobile station. Further, in the case of E-UTRAN (Evolved UTRAN), "communicating" corresponds to RRC_CONNECTED state where data is transmitted and received between a base station and a mobile station using downlink and uplink shared channels (i.e., Physical Downlink Shared Channel (PDSCH) and Physical Downlink Shared Channel (PUSCH)).

In UTRAN and E-UTRAN, a handover control entity of a serving cell, such as a base station or RNC that manages the serving cell, instructs a mobile station to send a measurement report when a predetermined HO initiation condition is satisfied. One example of a HO initiation condition is degradation of radio quality of a serving cell. Note that, with regard to measurements relating to HO in E-UTRAN, the following five events A1 to A5 are specified in the 3GPP technical specification TS 36.331. Generally, either one of the event A3 or A5 is used as a HO initiation condition.

Event A1: Serving becomes better than absolute threshold;
Event A2: Serving becomes worse than absolute threshold;
Event A3: Neighbour becomes amount of offset better than serving;
Event A4: Neighbour becomes better than absolute threshold;
Event A5: Serving becomes worse than absolute threshold1 AND Neighbour becomes better than another absolute threshold2.

A measurement report generated by a mobile station contains a measurement result of radio quality of a neighbour cell (or neighbour cells) adjacent to the serving cell. In response to receiving a measurement report from a mobile station, a handover control entity of a serving cell determines a handover destination cell (i.e., target cell) based on the measurement report and initiates signaling for handover with a handover control entity of the target cell.

Accordingly, transmission of a measurement report by a mobile station in UTRAN and E-UTRAN is considered as a HO initiation request and is used as a triggering operation to initiate handover. Therefore, in UTRAN and E-UTRAN, TTT is used to adjust a lag time from when a HO initiation condition is first satisfied to when a measurement report is actually transmitted. For example, a mobile station determines a handover (HO) initiation state based on that a period during which a HO initiation condition that radio quality of a neighbour cell is higher than radio quality of a peripheral cell continues to be satisfied becomes longer than TTT, and then transmits a measurement report as a HO initiation request. Because the duration of the HO initiation condition needs to be longer as TTT is longer, the handover initiation timing is delayed and handover becomes difficult to occur.

Note that, in this specification, a state that serves as a trigger to initiate handover of a mobile station is referred to as "HO initiation state". A "HO initiation state" is determined based on that a period during which a "HO initiation condition" continues to be satisfied becomes longer than TTT. When the "HO initiation state" is met, handover of a mobile station is initiated.

Further, in cellular radio communications, it is known to employ cell arrangement where a large-scale cell (e.g., a macrocell) and a small-scale cell (e.g., a microcell, a picocell, a femtocell) are laid to overlap each other as one solution to meet a demand for sufficient communication capacity and a demand for sufficient coverage. The overlap of the large-scale cell and the small-scale cell includes not only complete overlap in which the small-scale cell is completely included in the large-scale cell but also partial overlap in which a part of coverage of the large-scale cell and a part of coverage of the small-scale cell overlap. Such cell arrangement is called Hierarchical Cell Structure (HCS) or Heterogeneous Network (HetNet).

Non Patent Literature 1 shows a result of study about reduction of handover failures in HCS (HetNet). To be more specific, Non Patent Literature 1 presents a simulation result indicating that handover-failure rate, from a macrocell to a picocell, is significantly higher than handover-failure rate between macrocells particularly when a mobile station is moving at high speed and TTT (Time to Trigger) is long. Thus, Non Patent Literature 1 proposes that it is necessary to set a different TTT for handover to a picocell than that for handover to a macrocell.

Further, Patent Literature 1 discloses a technique to reduce handovers, of mobile stations moving at high speed, from a large-scale cell (for example, a macrocell) to a small-scale cell (for example, a microcell). To be specific, Patent Literature 2 discloses a technique that configures downlink coverage of a microcell to be smaller than uplink coverage thereof in HCS (HetNet). Patent Literature 1 discloses three different ways as specific methods to achieve reduction of the downlink coverage: (1) reducing pilot transmission power of a microcell, (2) adjusting a tilt angle of a downlink antenna of a microcell base station and (3) virtually reducing pilot received power of a microcell used for determination of handover by giving offset. According to the technique disclosed in Patent Literature 1, it is expected to reduce handover from a macrocell to a microcell.

Furthermore, in cellular radio communications, handover optimization is known as one technique related to SON (Self Organizing Network). Patent Literature 2 discloses a technique that reduces handover failures (i.e., too late handover, too early handover) by dynamically adjusting HO parameters including TTT based on measurement reports from mobile stations. To be specific, Patent Literature 2 discloses a technique that shortens TTT for reduction of too late handovers and lengthens TTT for reduction of too early handovers.

CITATION LIST

Patent Literature

PTL1: International Patent Publication No. WO 2005/057975
PTL2: International Patent Publication No. WO 2010/002926

Non Patent Literature

NPL1: 3GPP contribution, R2-104017 "Mobility support to pico cells in the co-channel HetNet deployment", June 2010

SUMMARY OF INVENTION

Technical Problem

The inventors of the present invention have found that the above-described techniques disclosed in Non Patent Literature 1 and Patent Literatures 1 and 2 cannot sufficiently achieve optimization of handover suitable for HCS (HetNet). This problem is described in detail below.

Non Patent Literature 1 suggests to reduce handover failures by setting TTT for a picocell to be shorter than TTT for a macrocell. However, merely shortening TTT for a picocell accelerates handover to a picocell. Therefore, the technique of Non Patent Literature 1 has a problem that handover failure (i.e., too early handover), ping-pong handover and rapid handover of a mobile station moving at high speed are likely to occur.

Likewise, when using the technique of Patent Literature 2, handover failure of a mobile station moving at high speed is determined as too late handover. Therefore, adjustment that shortens TTT is performed to reduce too late handovers. Thus, the technique of Patent Literature 2 also has a problem that handover failure (i.e., too early handover), ping-pong handover and rapid handover of a mobile station moving at high speed are likely to occur.

On the other hand, mere lengthening TTT increases possibility that disconnection of communication of a mobile station (i.e., too late handover) occurs due to degradation of radio quality of a macrocell as a serving cell. Accordingly, there is a conflicting relation that lengthening TTT allows a decrease in too early handover, ping-pong handover and rapid handover but causes an increase in too late handover, and shortening TTT allows a decrease in too late handover but causes an increase in too early handover, ping-pong handover and rapid handover.

As already mentioned above, Patent Literature 1 discloses a technique that virtually reduces downlink coverage of a small-scale cell by giving offset to pilot received power of the small-scale cell, but Patent Literature 1 discloses nothing about adjustment of TTT. Further, in HCS (HetNet), mere reducing handover failures from a large-scale cell to a small-scale cell and reducing ping-pong handover and rapid handover are not sufficient. Specifically, the primary objects of adopting HCS (HetNet) include load sharing by offloading traffic of a large-scale cell to a small-scale cell, provision of a high-speed service by a small-scale cell and the like. To attain those objects, it is necessary to accommodate a mobile station expected to stay in a small-scale cell for at least a certain period of time in a small-scale cell. However, because downlink coverage of a small-scale cell is reduced in the technique disclosed in Patent Literature 1, handover to a small-scale cell is suppressed, and further communication capacity of a small-scale cell is reduced. There is thus a problem that offloading of traffic to a small-scale cell is insufficient.

The present invention is based on the above observations by the present inventors. Specifically, an object of the invention is to provide a handover control method, a control apparatus, an adjustment apparatus, and a program that are capable of, in HCS (HetNet), reduction of both handover failures and ping-pong handovers and efficient accommodation of a mobile station expected to stay in a small-scale cell for at least a certain period of time in a small-scale cell Solution to Problem A first aspect of the present invention includes a control method for handover of a mobile station from a first cell to a second cell. The method includes adjusting a handover parameter so that, when radio quality of the first cell at a position of the mobile station is a first level, lag time from when a handover initiation condition is satisfied to when the handover is initiated is shorter than when the radio quality of the first cell is a second level that is higher than the first level.

A second aspect of the present invention includes a control apparatus. The control apparatus includes a determination unit that determines, using a handover parameter, a handover initiation state serving as a trigger to initiate handover of a mobile station from a first cell to a second cell. The handover parameter is adjusted so that, when radio quality of the first cell at a position of the mobile station is a first level, lag time from when a handover initiation condition is satisfied to when the handover is initiated is shorter than when the radio quality of the first cell is a second level that is higher than the first level.

A third aspect of the present invention includes an adjustment apparatus. The adjustment apparatus is used in combination with the control apparatus according to the second aspect of the invention described above. The adjustment apparatus is configured to adjust the handover parameter based on a history of the handover.

A fourth aspect of the present invention includes a computer program. The program is read and executed by a computer and thereby causes the computer to perform initiation control for handover of a mobile station from a first cell to a second cell. The initiation control includes determining, using a handover parameter, a handover initiation state serving as a trigger to initiate the handover. The handover parameter is adjusted so that, when radio quality of the first cell at a position of the mobile station is a first level, lag time from when a handover initiation condition is satisfied to when the handover is initiated is shorter than when the radio quality of the first cell is a second level that is higher than the first level.

Advantageous Effects of Invention

According to the above-described aspects of the invention, in HCS (HetNet), handover failures, ping-pong handovers and rapid handovers can be reduced, and a mobile station expected to stay in a small-scale cell for at least a certain period of time can be efficiently accommodated in a small-scale cell.

DESCRIPTION OF EMBODIMENTS

Specific embodiments of the present invention will be described hereinafter in detail with reference to the drawings. It is noted that in the description of the drawings, the same elements will be denoted by the same reference symbols and redundant description will be omitted as appropriate to clarify the description.

First Embodiment

Figure 1:
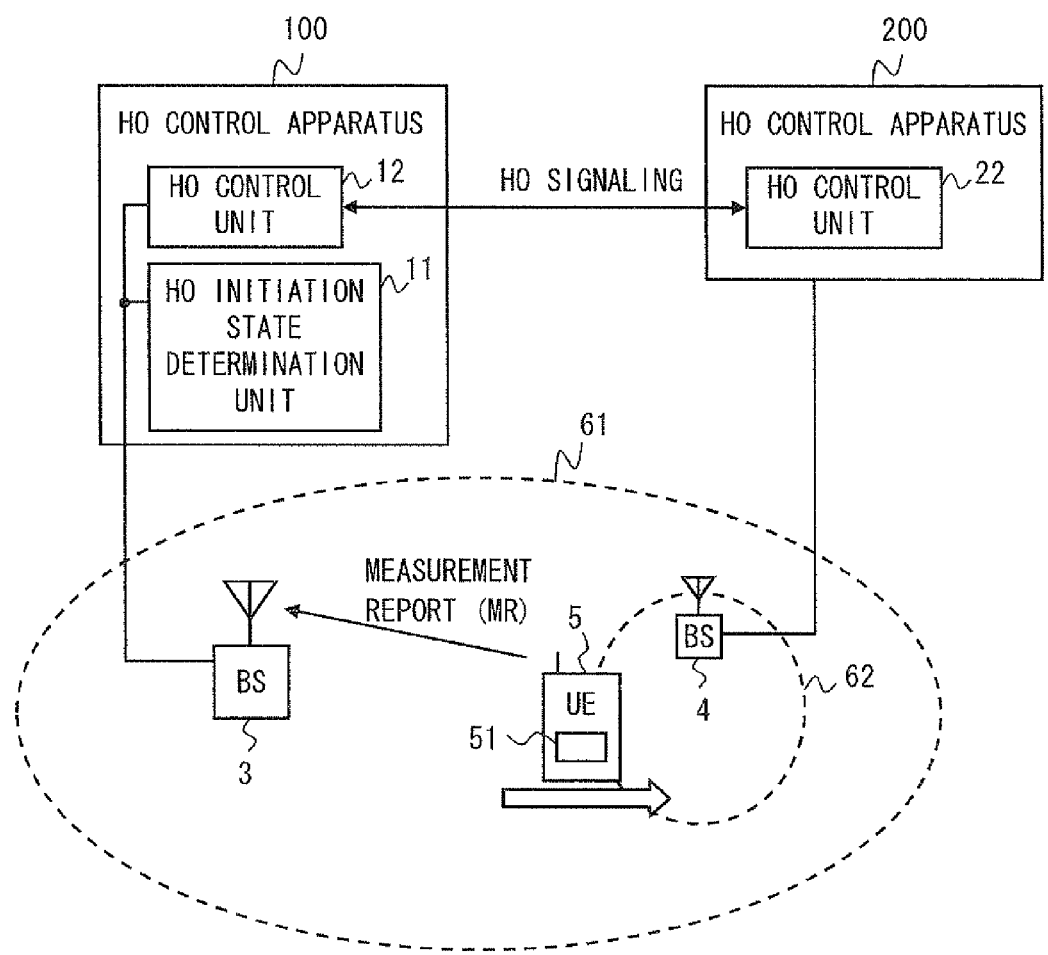
FIG. 1 is a diagram showing a configuration example of a cellular communication network according to a first embodiment.

FIG. 1 shows a configuration example of a network according to this embodiment. A handover control method according to this embodiment is performed by a handover (HO) initiation state determination unit 11. The HO initiation state determination unit 11 determines a HO initiation state. The HO initiation state serves as a trigger for handover of a mobile station (User Equipment (UE)) 5, which is connecting to and communicating with a serving cell 61, to a neighbour cell 62. The HO initiation state determination unit 11 uses the hold time, i.e., TTT, to provide lag time from when the HO initiation condition is satisfied to when the handover is initiated. Specifically, the HO initiation state determination unit 11 determines the HO initiation state based on that a period during which the HO initiation condition is satisfied continues longer than TTT. Further, the HO initiation state determination unit 11 is characterized in that it determines two HO initiation states by using different TTTs for two different HO initiation conditions.

To be specific, a first TTT (TTT1) that is used when radio quality of the serving cell 61 at the position of the UE 5 is a first level, which is relatively low, is adjusted to be shorter than a second TTT (TTT2) that is used when the radio quality of the serving cell 61 at the position of the UE 5 is a second level, which is relatively high. In other words, the HO initiation state determination unit 11 uses the first TTT (TTT1), which is relatively short, for a first HO initiation condition corresponding to the case where the radio quality of the serving cell 61 at the position of the UE 5 is relatively low, and uses the second TTT (TTT2), which is relatively long, for a second HO initiation condition corresponding to the case where the radio quality of the serving cell 61 at the position of the UE 5 is relatively high.

Thus, according to the determination method for the HO initiation state in this embodiment, when the radio quality of the serving cell 61 at the position of the UE 5 is the relatively low first level, the lag time from when the HO initiation condition is satisfied to when the handover is initiated is shorter than when the radio quality of the serving cell 61 is the relatively high second level. Accordingly, in the case where the radio quality of the serving cell 61 is degraded (first quality level), handover is initiated in a short time after the HO initiation condition is satisfied by the effect of the relatively short TTT1. This allows the UE 5 to perform handover to the neighbour cell 62 promptly, thereby reducing the occurrence of handover failure (i.e., too late handover).

Further, in the case where the radio quality of the serving cell 61 is not so degraded (second quality level), it is required that the HO initiation condition continues to be satisfied for a long time by the effect of the relatively long TTT2. This makes handover to the neighbour cell 62 difficult to occur. There is thus an advantage particularly in the case of HCS (HetNet) where coverage of the neighbour cell 62 is smaller than that of the serving cell 61, which is, for example, the case where the serving cell 61 is a macrocell and the neighbour cell 62 is a microcell, a picocell or a femtocell. Specifically, by using the relatively long TTT2, it is expected that, when the UE 5 is moving at high speed, the radio quality of the neighbour cell 62 is degraded again before the TTT2 expires. Therefore, handover of a UE that passes through the neighbour cell 62 in a short time is not initiated, and thereby handover failures (too early handover), ping-pong handovers and rapid handovers can be reduced. On the other hand, when the UE 5 is moving at low speed, handover to the neighbour cell 62 is initiated upon expiration of the TTT2. This allows a UE that is expected to stay in the neighbour cell 62 for a long time to perform handover to the neighbour cell 62, and thereby load on the serving cell 61 can be distributed.

As is obvious form the above description, according to the method of determining the HO initiation state performed by the HO initiation state determination unit 11 of this embodiment, it is possible, in HCS (HetNet), to reduce handover failures, ping-pong handovers and rapid handovers, and to efficiently accommodate the UE 5 that is expected to stay in a small-scale cell for at least a certain period of time within the small-scale cell.

Hereinafter, examples where the HO initiation state determination method according to this embodiment is applied to an actual network are specifically described. In FIG. 1, a HO control apparatus 100 signals with a HO control apparatus 200 and thereby controls the outbound and inbound handovers between the serving cell 61 managed by a serving base station 3 and the neighbour cell 62 managed by a neighbour base station 4 by signaling with. The HO control apparatus 200 is a handover control entity of the neighbour cell 62. The HO control apparatus 100 includes the above-described HO initiation state determination unit 11 and a HO control unit 12. When the HO initiation state determination unit 11 determines the HO initiation state, the HO control unit 12 decides a target cell (i.e., the neighbour cell 62 in this example) and initiates signaling with a HO control unit 22 of the target cell for handover of the UE 5. For example, the HO initiation state determination unit 11 may determine satisfaction of the HO condition and satisfaction of the HO initiation state by referring to a measurement report (MR) transmitted from the UE 5. Alternatively, for example, the HO initiation state determination unit 11 may receive from the UE 5 a notification indicating that the HO initiation condition is satisfied and may determine the HO initiation state depending on period where the notification continues to be received. In the latter case, the UE 5 determines satisfaction of the HO initiation condition, and the HO initiation state determination unit 11 determines satisfaction of the HO initiation state using TTT. The HO control unit 12 may decide a target cell by, for example, referring to the measurement report transmitted from the UE 5.

The UE 5 includes a sending unit 51 that sends a measurement report and thereby wirelessly sends a measurement report containing a measurement result of radio quality of the serving cell 61 and the neighbour cell 62. A typical example of radio quality of a cell measured by the UE 5 is received signal quality of a radio signal (downlink signal) transmitted from a base station. The received signal quality is, for example, received power or SINR (Signal to Noise Interference Ratio) of a pilot signal, a reference signal or the like. In the case of UTRAN, radio quality of a cell may be received power (CPICH RSCP: Received Signal Code Power) of a common pilot channel (CPICH) or Ec/No of CPICH. In the case of E-UTRAN, radio quality of a cell may be received power of a downlink reference signal (RSRP: Reference Signal Received Power) or received quality of a downlink reference signal (RSRQ: Reference Signal Received Quality).

Figure 2:
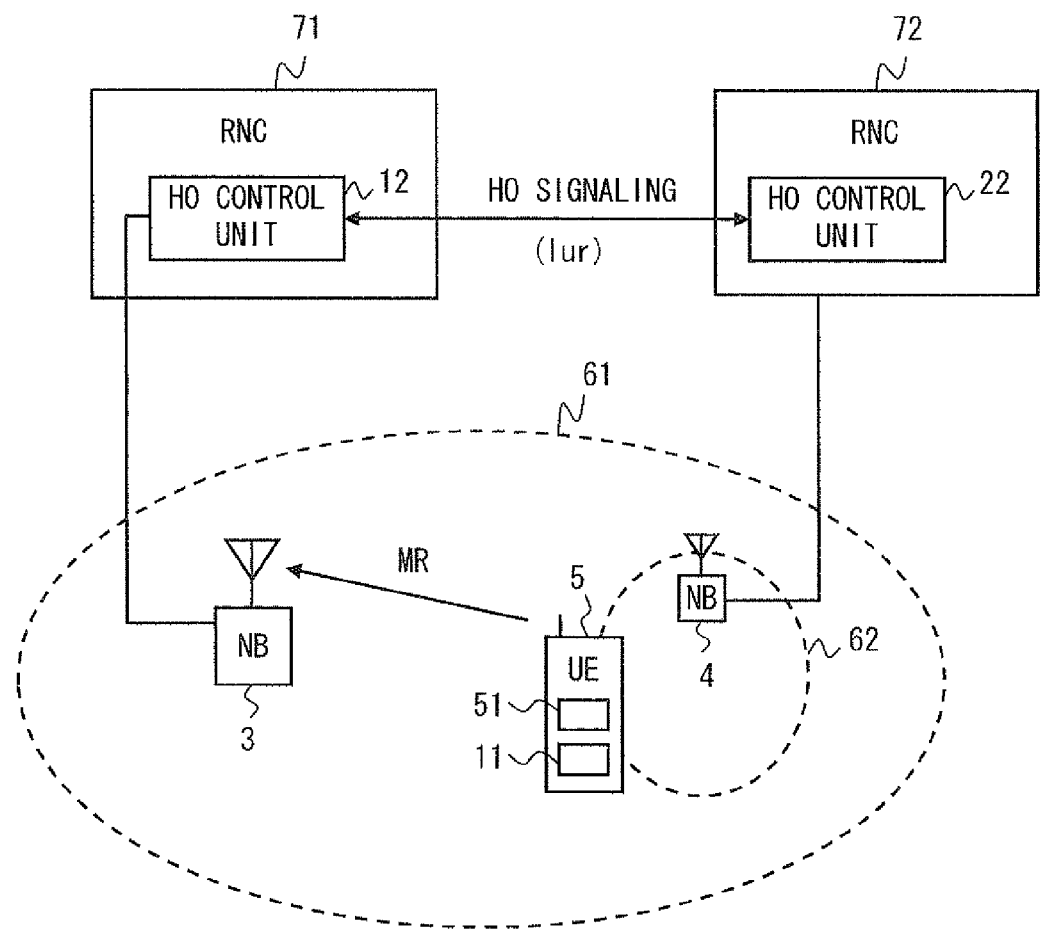
FIG. 2 is a diagram showing another configuration example of the cellular communication network according to the first embodiment.

The placements of the HO initiation state determination unit 11 and the HO control units 12 and 22 are appropriately decided on the basis of network architecture design concept. For example, in the case where this embodiment is applied to UTRAN, as shown in FIG. 2, the HO initiation state determination unit 11 may be placed in the UE 5, and the HO control units 12 and 22 may be placed in RNCs 71 and 72 having radio resource management function and handover control function. In this case, the HO control units 12 and 22 perform signaling for handover using a communication interface between RNCs (i.e., Iur interface). There is a case where the radio resource management of the serving cell 61 and the neighbour cell 62 is performed by one RNC (Radio Network Controller). In this case, there is no need to place the HO control unit 22 and the RNC 72. When the HO initiation state determination unit 11 determines that the first HO initiation condition and the first HO initiation state using TTT1 or the second HO initiation condition and the second HO initiation state using TTT2 are satisfied, the HO initiation state determination unit 11 sends to the RNC 71 a measurement report containing a measurement result of radio quality of the neighbour cell 62. As described above, in UTRAN, a measurement report sent from the UE 5 is used as a notification that the HO initiation state is satisfied, or a HO initiation request.

Figure 3:
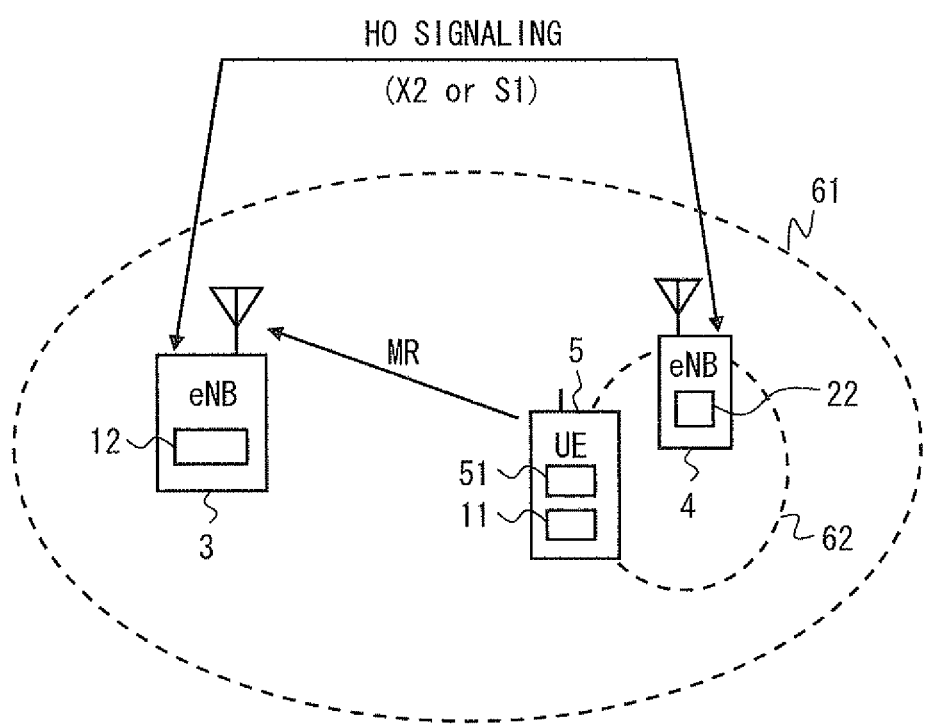
FIG. 3 is a diagram showing yet another configuration example of the cellular communication network according to the first embodiment.

On the other hand, in the case where this embodiment is applied to E-UTRAN, as shown in FIG. 3, the HO initiation state determination unit 11 may be placed in the UE 5, and the HO control units 12 and 22 may be placed in base stations (i.e., eNB) 3 and 4 having radio resource management function and handover control function. In this case, the HO control units 12 and 22 perform signaling for handover using a communication interface between base stations (i.e., X2 interface) or a communication interface (i.e., S1-MME interface) with MME (Mobility Management Entity) placed in a core network. As in the case of UMTS, when the HO initiation state determination unit 11 determines that the first HO initiation condition and the first HO initiation state using TTT1 or the second HO initiation condition and the second HO initiation state using TTT2 are satisfied, the HO initiation state determination unit 11 sends to the base station 3 a measurement report containing a measurement result of radio quality of the neighbour cell 62.

Figure 4:
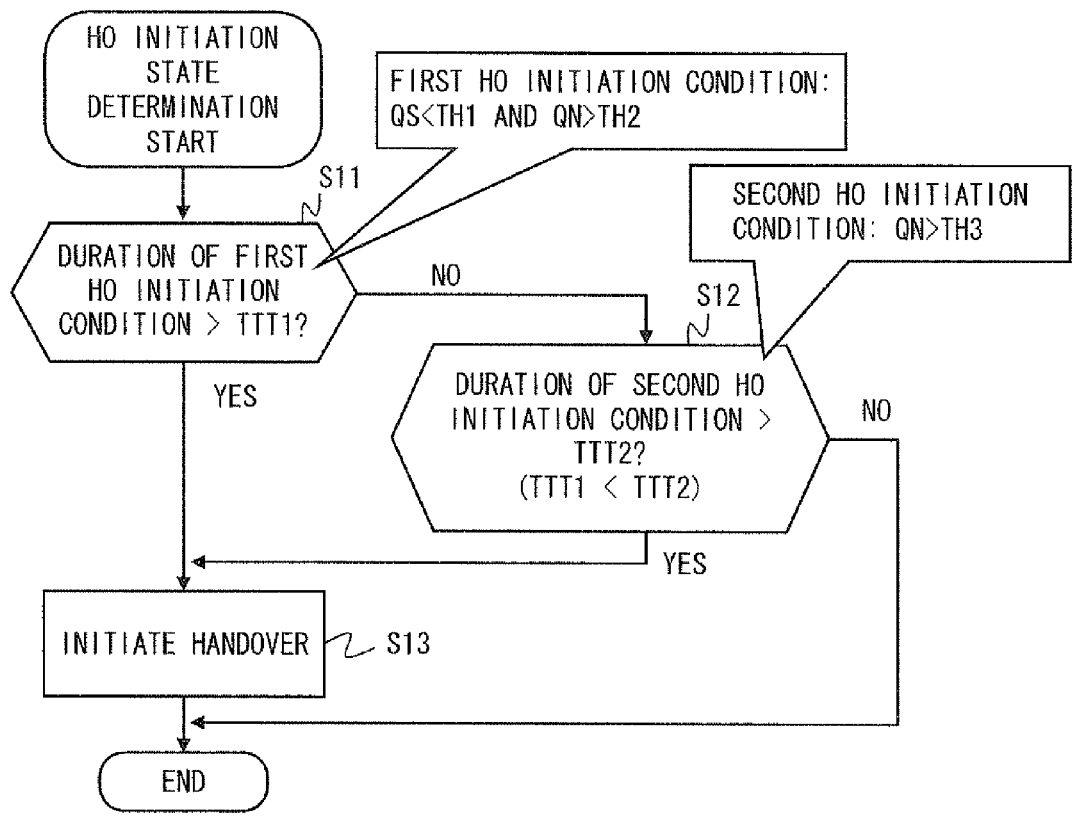
FIG. 4 is a flowchart showing a first specific example of a determination method for a handover initiation state according to the first embodiment.
Figure 5:
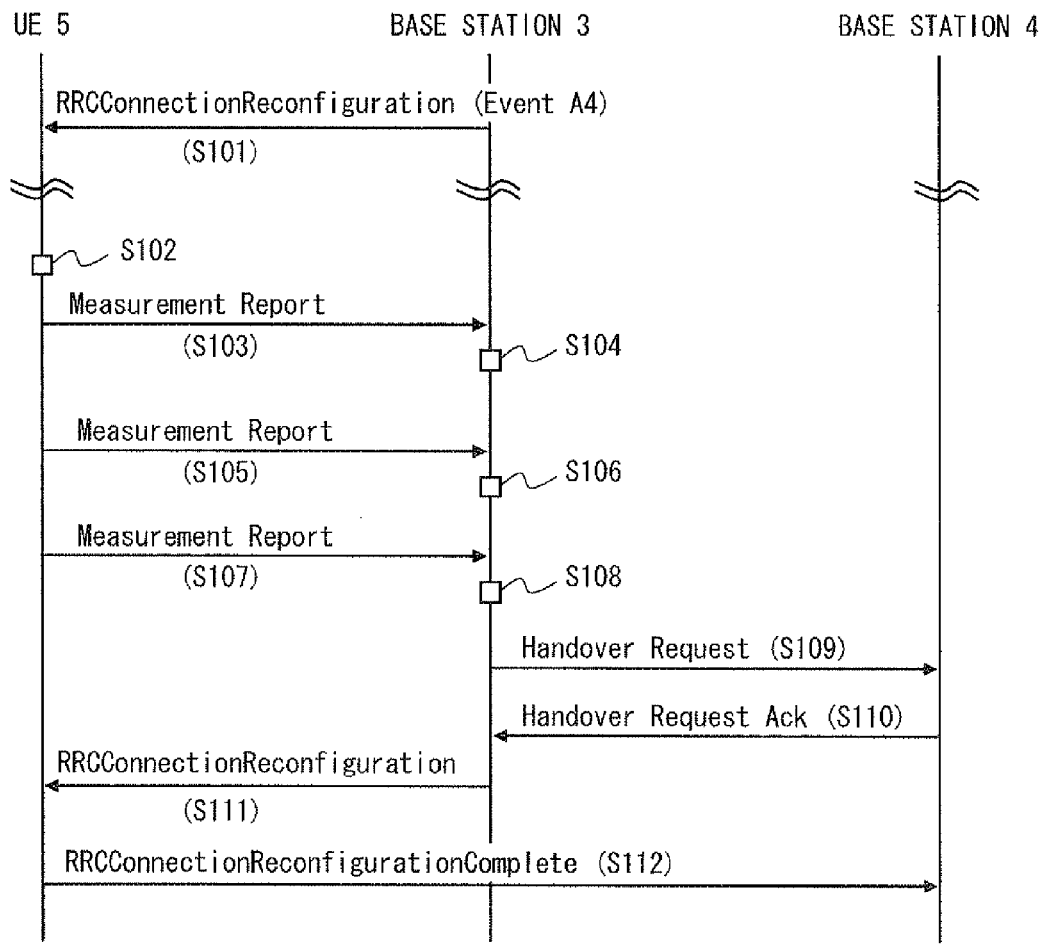
FIG. 5 is a sequence chart related to the first specific example of FIG. 4.
Figure 6:
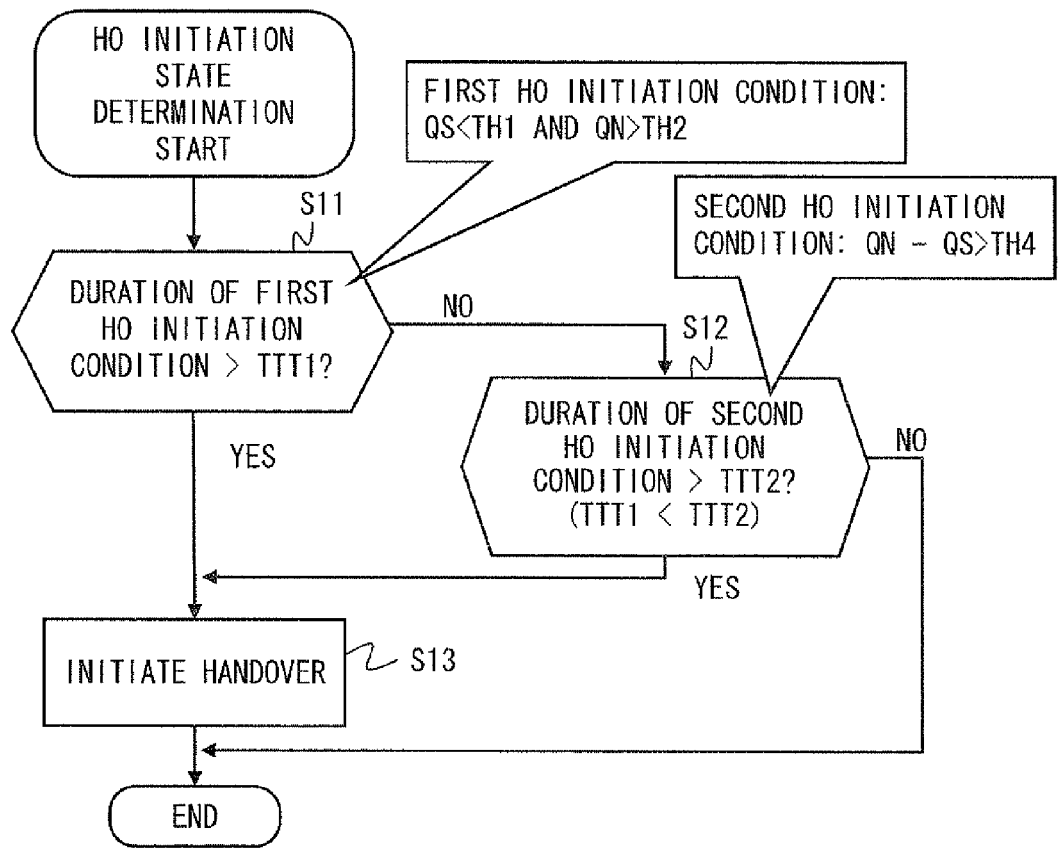
FIG. 6 is a flowchart showing a second specific example of a determination method for a handover initiation state according to the first embodiment.

Specific examples of a procedure to determine the HO initiation state by the HO initiation state determination unit 11 are described hereinafter with reference to the flowcharts of FIGS. 4 to 6. A first specific example shown in the flowchart of FIG. 4 is the case where a control apparatus that is in the upper network and is different from the UE 5 performs determination of the HO initiation state. In Step S11 of FIG. 4, the HO initiation state determination unit 11 determines whether or not a period (duration) during which the first HO initiation condition continues to be satisfied is longer than TTT1 using measurement reports collected from the UE 5. As described above, the first HO initiation condition corresponds to the case where the radio quality of the serving cell 61 at the position of the UE 5 is relatively low. For example, as shown in FIG. 4, the first HO initiation condition may be "the radio quality QS of the serving cell 61 is less than a threshold TH1, and the radio quality QN of the neighbour cell 62 is higher than a threshold TH2". This definition corresponds to "Event A5" specified in 3GPP TS 36.331. When the duration of the first HO initiation condition is longer than TTT1 (YES in Step S11), the HO initiation state determination unit 11 determines that the first HO initiation state is satisfied and then requests the HO control unit 12 to initiate handover. In response to the request, the HO control unit 12 initiates handover (Step S13).

On the other hand, when the radio quality QS of the serving cell 61 is not degraded, the first HO initiation condition is not satisfied and satisfaction of the first HO initiation state is not determined (NO in Step S11). The case where QS is not degraded is, for example, where QS is equal to or higher than TH1 or where period during which QS is less than TH1 is instantaneous and does not continue until TTT1. In such cases, the HO initiation state determination unit 11 determines the duration of the second HO initiation condition using TTT2, which is longer than TTT1 (Step S12). As described above, the second HO initiation condition corresponds to the case where radio quality of the serving cell 61 at the position of the UE 5 is relatively high. For example, as shown in FIG. 4, the second HO initiation condition may be "the radio quality QN of the neighbour cell 62 is higher than a threshold TH3". This definition corresponds to "Event A4" specified in 3GPP TS 36.331. The threshold TH3 may be the same value as the threshold TH2. It is not necessary to explicitly include a condition for radio quality of the serving cell 61 into the definition of the second HO initiation condition. This is because TTT1, which is shorter than TTT2, is used for the first HO initiation condition, and thereby the first HO initiation state is satisfied first in the case where the quality of the serving cell 61 is low. In other words, the determination of the second HO initiation state implicitly includes a condition that "duration where the radio quality QS of the serving cell 61 is less than a threshold TH1 is shorter than TTT1". When duration of the second HO initiation condition is longer than TTT2 (YES in Step S12), the HO initiation state determination unit 11 determines that the second HO initiation state is satisfied and then requests the HO control unit 12 to initiate handover. In response to the request, the HO control unit 12 initiates handover (Step S13).

An operation in the case where the first specific example shown in FIG. 4 is applied to E-UTRAN is described hereinafter with reference to the sequence chart of FIG. 5. The base station 3 instructs, using a RRC ConnectionReconfiguration message sent to the UE 5, about event type for issuing a measurement report, condition for issuing a measurement report, the number of times of issuing a measurement report and cycle of issuing a measurement report (S101). In the example of FIG. 5, the base station 3 specifies Event A4. Event A4 is used as a trigger to make a UE report radio quality of the serving cell and the neighbour cell at regular intervals. Further, appropriate values are set to the number of times of issuing and the cycle of issuing a measurement report.

Next, it is assumed that the condition for issuing Event A4 is satisfied in the UE 5 (S102). Then, the UE 5 issues Event A4 to the base station 3 (S103).

The UE 5 reports the radio quality of the serving cell 61 and the neighbour cell 62 periodically using a measurement report message based on an instruction from the base station 3 (S105, S107). The base station 3 receives the measurement report message and then determines, in the HO initiation state determination unit 11, whether or not to satisfy one of the first and second HO initiation states (S106, S108). When one of the first and second HO initiation states is satisfied (S108), the HO control unit 12 performs HO signaling with the handover destination base station 4 and lets the UE 5 handover (S109 to S112).

A combination of the first and second HO initiation conditions shown in FIG. 4 is just an example. The first HO initiation condition is not limited thereto as long as it includes "the radio quality of the serving cell 61 is degraded". Further, the second HO initiation condition is not limited thereto as long as it includes "the radio quality of the neighbour cell 62 is good enough". The second example in FIG. 6 shows that the second HO initiation condition is altered from that of FIG. 4. As shown in FIG. 6, the definition of the second HO initiation condition which is applied to Step S12 may be "the radio quality QN of the neighbour cell is higher than the radio quality QS of the serving cell by more than a threshold TH4". This definition corresponds to "Event A3" specified in 3GPP TS 36.331.

Figure 7:
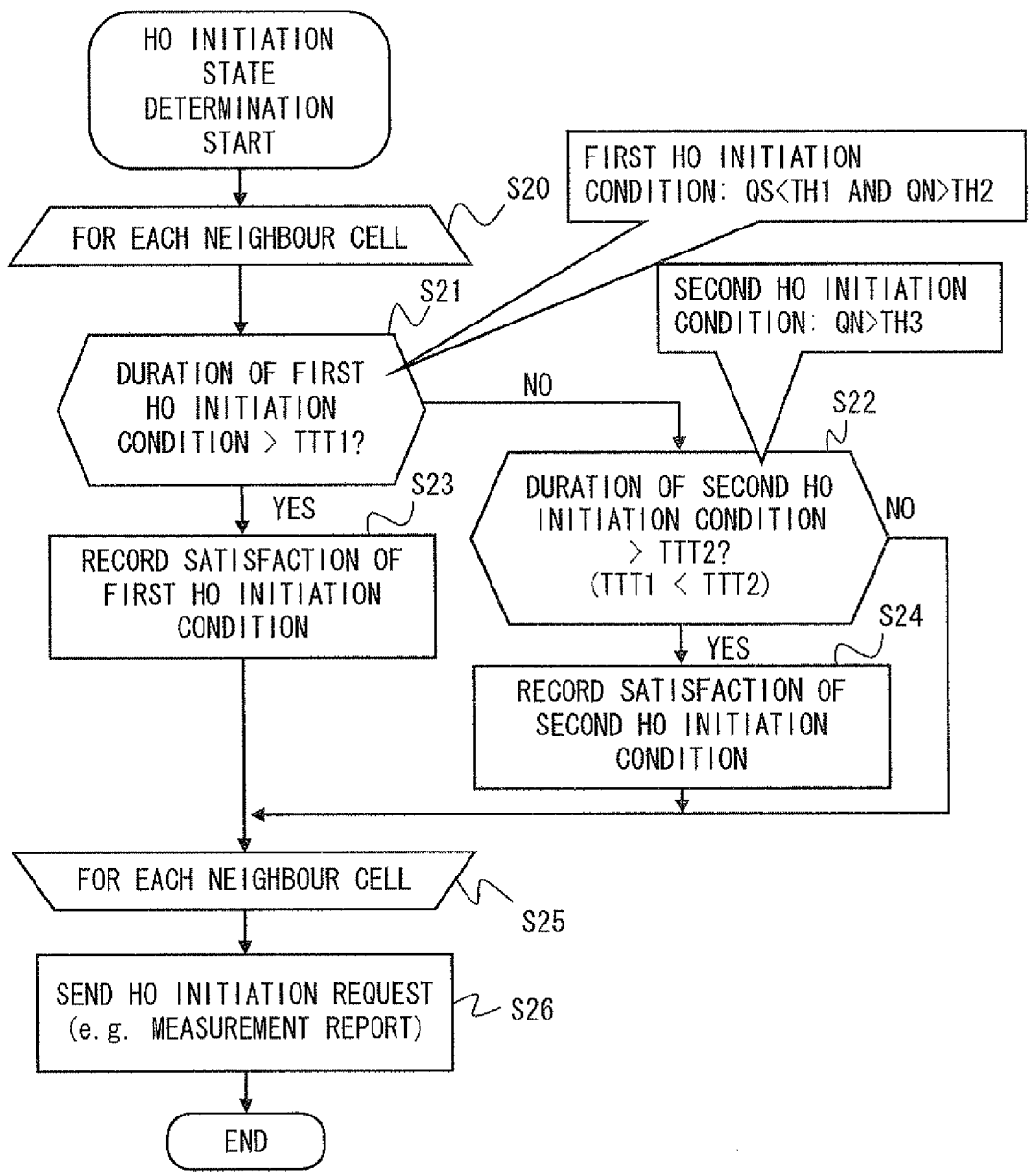
FIG. 7 is a flowchart showing a third specific example of a determination method for a handover initiation state according to the first embodiment.

The third specific example shown in the flowchart of FIG. 7 is the case where the UE 5 performs determination of the HO initiation condition. The HO initiation state determination unit 11 repeats the loop processing of Steps S20 to S25 of FIG. 4 for each of neighbour cells. In Step S21 within the loop processing, the HO initiation state determination unit 11 determines whether duration of the first HO initiation condition is longer than TTT1, using a measurement result of radio quality of the serving cell 61 and neighbour cells including the neighbour cell 62. The first HO initiation condition shown in FIG. 7 is the same as that shown in FIG. 4. When duration of the first HO initiation condition is longer than TTT1 (YES in Step S21), the HO initiation state determination unit 11 determines that the first HO initiation state is satisfied and records satisfaction of the first HO initiation condition (or satisfaction of the first HO initiation state) for the objective neighbour cell (Step S23).

When the radio quality QS of the serving cell is not degraded (NO in Step S21), the HO initiation state determination unit 11 determines continuity of the second HO initiation condition using TTT2 that is longer than TTT1 (Step S22). The second HO initiation condition shown in FIG. 6 is the same as that shown in FIG. 4. When duration of the second HO initiation condition is longer than TTT2 (YES in Step S22), the HO initiation state determination unit 11 determines that the second HO initiation state is satisfied and records satisfaction of the second HO initiation condition (or satisfaction of the second HO initiation state) for the objective neighbour cell (Step S24).

When the loop processing (Steps S20 to S25) is done with all neighbour cells detected by the UE 5 and satisfaction of the first and second initiation conditions is recorded, the sending unit 51 sends a HO initiation request to the handover control entity placed in the upper network (Step S26). The HO initiation request may be, for example, a measurement report containing the record of satisfaction of the first and second initiation conditions.

Figure 8:
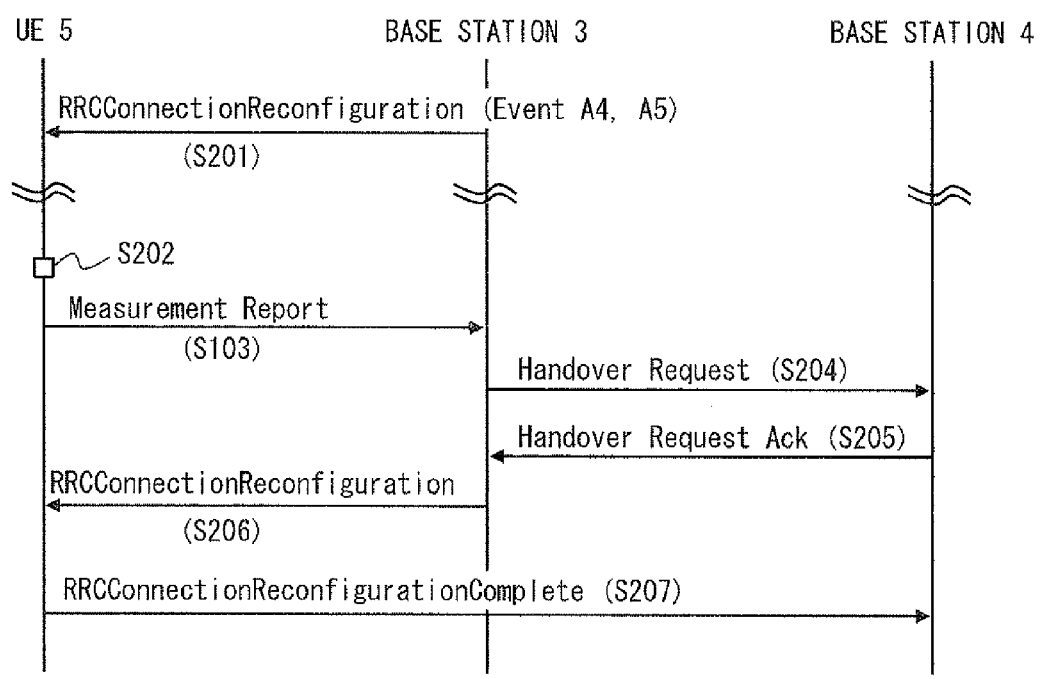
FIG. 8 is a sequence chart related to the third specific example of FIG. 7.

An operation in the case where the third specific example shown in FIG. 7 is applied to E-UTRAN is described hereinafter with reference to the sequence chart of FIG. 8. The base station 3 instructs, using a RRC ConnectionReconfiguration message sent to the UE 5, event type for issuing a measurement report, condition for issuing a measurement report and type of a measurement report (S201). In the example of FIG. 7, the base station 3 specifies Event A5 and Event A4. Event A5 is issued when duration of the first HO initiation condition becomes equal to or longer than TTT1, and corresponds to the above-described first HO initiation state. Event A4 is issued when the duration of the second HO initiation condition becomes equal to or longer than TTT2, and corresponds to the above-described second HO initiation state.

When the UE 5 determines to issue Event A4 or Event A5 (i.e., determines to satisfy the first or second HO initiation state) (S202), the UE 5 sends a measurement report to the base station 3 (S203).

The base station 3 receives the measurement report, and then decides the handover destination base station 4 using information contained in the report. Then, the base station 3 performs HO signaling with the base station 4 and lets the UE 5 handover (S204 to S207).

Second Embodiment

Figure 9:
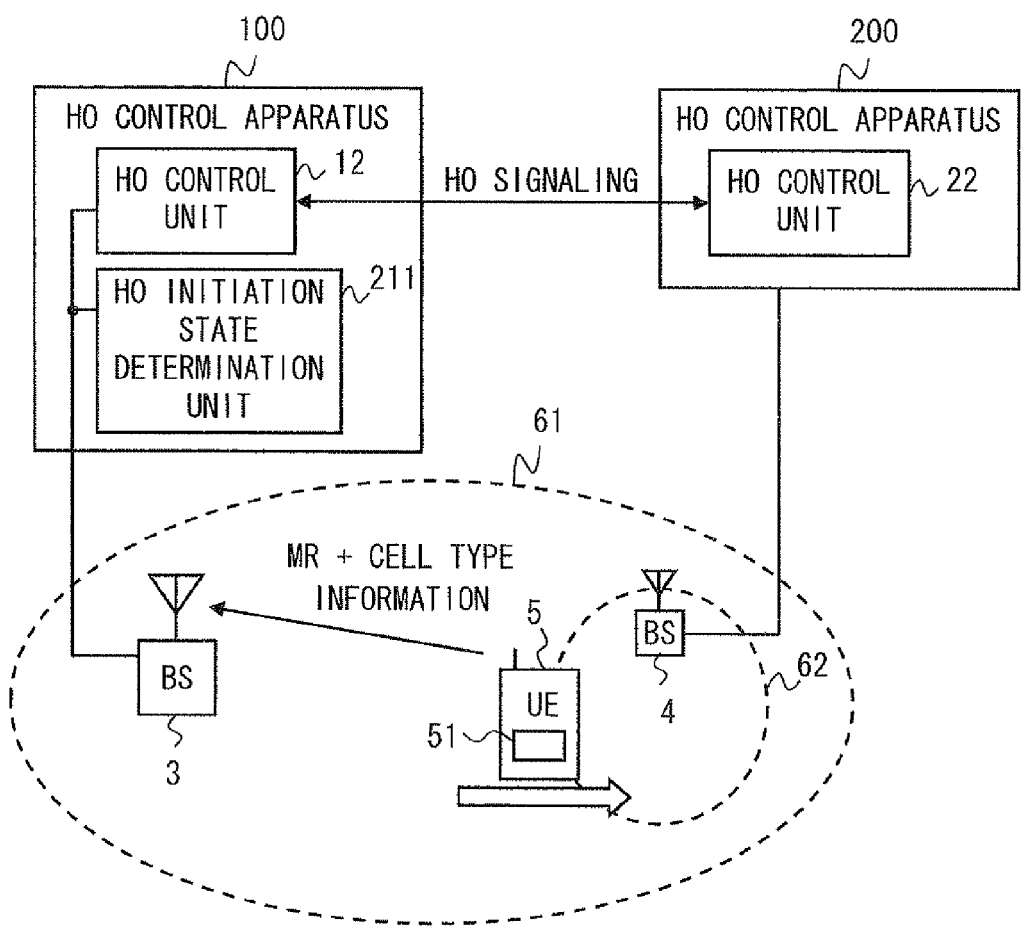
FIG. 9 is a diagram showing a configuration example of a cellular communication network according to a second embodiment.

In this embodiment, an alternative example of the above-described first embodiment is described. FIG. 9 shows a configuration example of a network according to this embodiment. FIG. 9 describes a HO condition determination unit 211 in place of the HO condition determination unit 11 shown in FIGS. 1 to 3.

The HO initiation state determination unit 211 according to this embodiment identifies cell type of the neighbour cell 62 and, only when the cell type of the neighbour cell 62 is a small-scale cell having smaller coverage (i.e., cell size) than the serving cell 61, performs determination of the first and second HO initiation states using the two HO initiation conditions and two TTTs (TTT1 and TTT2). On the other hand, when the cell type of the neighbour cell 62 is the same as the cell type of the serving cell 61, the HO initiation state determination unit 211 performs determination of one HO initiation state (for example, the first HO initiation state) using one HO initiation condition and one TTT (e.g., the first HO initiation condition and TTT1), in the same manner as before, without making determination of the two HO initiation states using the two HO initiation conditions and two TTTs. Note that the HO initiation state determination unit 211 may perform determination of the first and second HO initiation states using the two HO initiation conditions and TTT1 and TTT2 only when the cell type of the neighbour cell 62 is a specific small-scale cell (e.g., a picocell).

The HO initiation state determination unit 211 uses cell type information to decide the HO initiation state (including the HO initiation condition and TTT) to be used. The cell type information may be any information that can identify a difference in the cell size of the neighbour cell 62. For example, the cell type information may be any information that directly indicates a cell size. Alternatively, the cell type information may be an identifier that indicates which of attributes sorted by cell size, such as a macrocell, a microcell, a picocell and a femtocell, the neighbour cell belongs to. The cell type information may be information that indicates transmission power level of a radio signal (e.g., a pilot signal, a downlink reference signal) from a base station that manages each neighbour cell 62. Furthermore, the cell type information may be information that indicates intended purpose of a cell, such as whether it is a normal cell or a cell smaller than the normal cell which is placed for load sharing.

As shown in FIG. 9, the cell type information can be supplied to the HO condition determination unit 211 through various routes. In the case where the HO condition determination unit 211 is placed in an apparatus (the base station 3, the RNC 71 etc.) on the upper network side which is different from the UE 5, the neighbour cell information can be acquired by referring to a measurement report generated by the UE 5 or compiled information gathered from a plurality of measurement reports by the base station 3 or the like. In the case of acquiring the cell type information from the measurement report of the UE 5 or the compiled information, the cell type information may be added to a transmission signal of each base station that manages the neighbour cell 62. Alternatively, the cell type information may be acquired from network design information stored in the base station 3, or an element management system or a network management system (NMS) that manages the base station 3. The network design information includes cell layout information created by an operator of a telecommunications carrier or the like. Further, the cell type information may be acquired from both of the measurement report of the UE 5 or the compiled information and the network design information.

The HO initiation state determination unit 211 may be placed in the UE 5, in the same manner as the HO initiation state determination unit 11 described with reference to FIGS. 2 and 3. In the case where the HO initiation state determination unit 211 is placed in the UE 5, the UE 5 may acquire the cell type information contained in the transmission signal of each base station that manages the neighbour cell 62.

Figure 10:
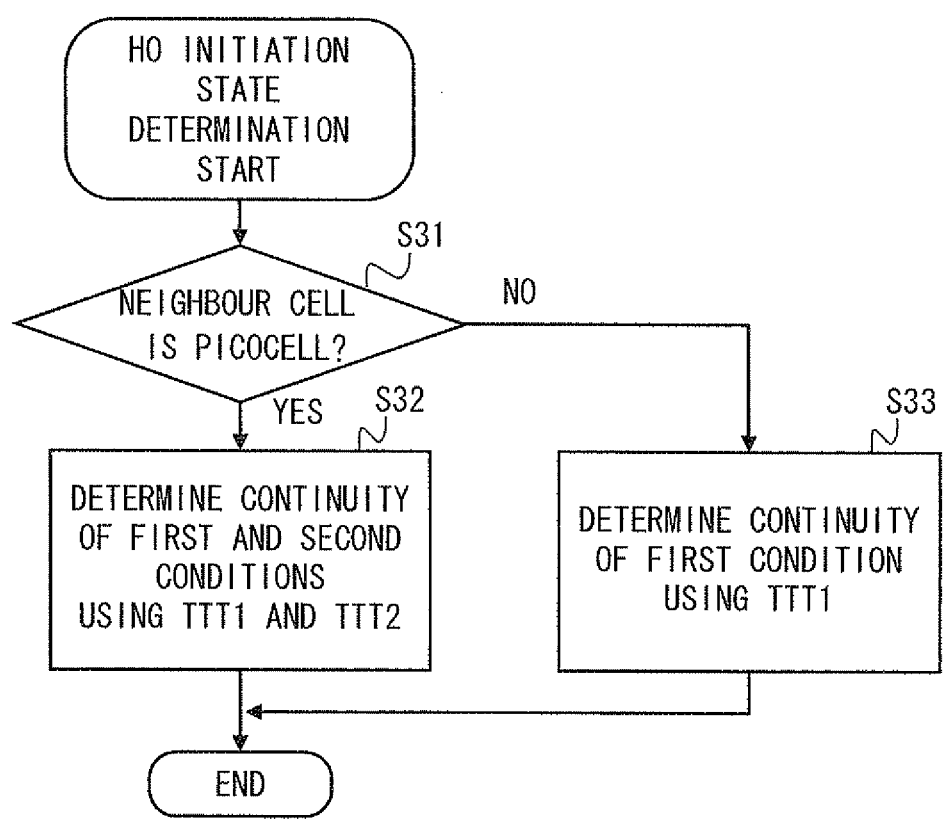
FIG. 10 is a flowchart showing a specific example of a determination method for a handover initiation state according to the second embodiment.

FIG. 10 is a flowchart showing a specific example of a procedure to determine the HO initiation state according to this embodiment. In the example of FIG. 10, the HO initiation state (including the HO initiation condition and TTT) to be used is changed depending on whether or not the neighbour cell 62 is a picocell. In Step S31, the HO initiation state determination unit 211 determines whether or not the neighbour cell 62 to be determined is a picocell. When the neighbour cell 62 is a picocell (YES in Step S31), the HO initiation state determination unit 211 determines the two HO initiation states in accordance with the procedure that uses the TTT1 and TTT2 described in the first embodiment (Step S32). For example, in Step S32, any one of the first to third specific examples described with reference to FIGS. 4 to 6 may be used.

On the other hand, when the neighbour cell 62 is not a picocell (NO in Step S31), the HO initiation state determination unit 211 determines the HO initiation state in a different procedure from the case where the neighbour cell 62 is a picocell (Step S33). For example, the HO initiation state determination unit 211 may only perform determination of the first HO initiation state (i.e., the continuity of the first HO initiation condition using TTT1) as specifically shown in FIG. 4, for example. Alternatively, in Step S33, the HO initiation state determination unit 211 may only perform determination of the second HO initiation state. When the neighbour cell 62 is not a picocell, such as when it is a macrocell, for example, occurrence of handover failure (i.e., too early handover) in a UE that is moving at high speed is not so serious as it is in the case of a picocell, and therefore determination may be made using one HO initiation state (i.e., one HO initiation condition and one TTT) in the same manner as the existing one.

According to this embodiment, an appropriate HO initiation state in accordance with cell size of a handover target cell can be used for determining initiation of handover, and it is thereby possible to contribute to reduction of degradation of handover performance.

Third Embodiment

Figure 11:
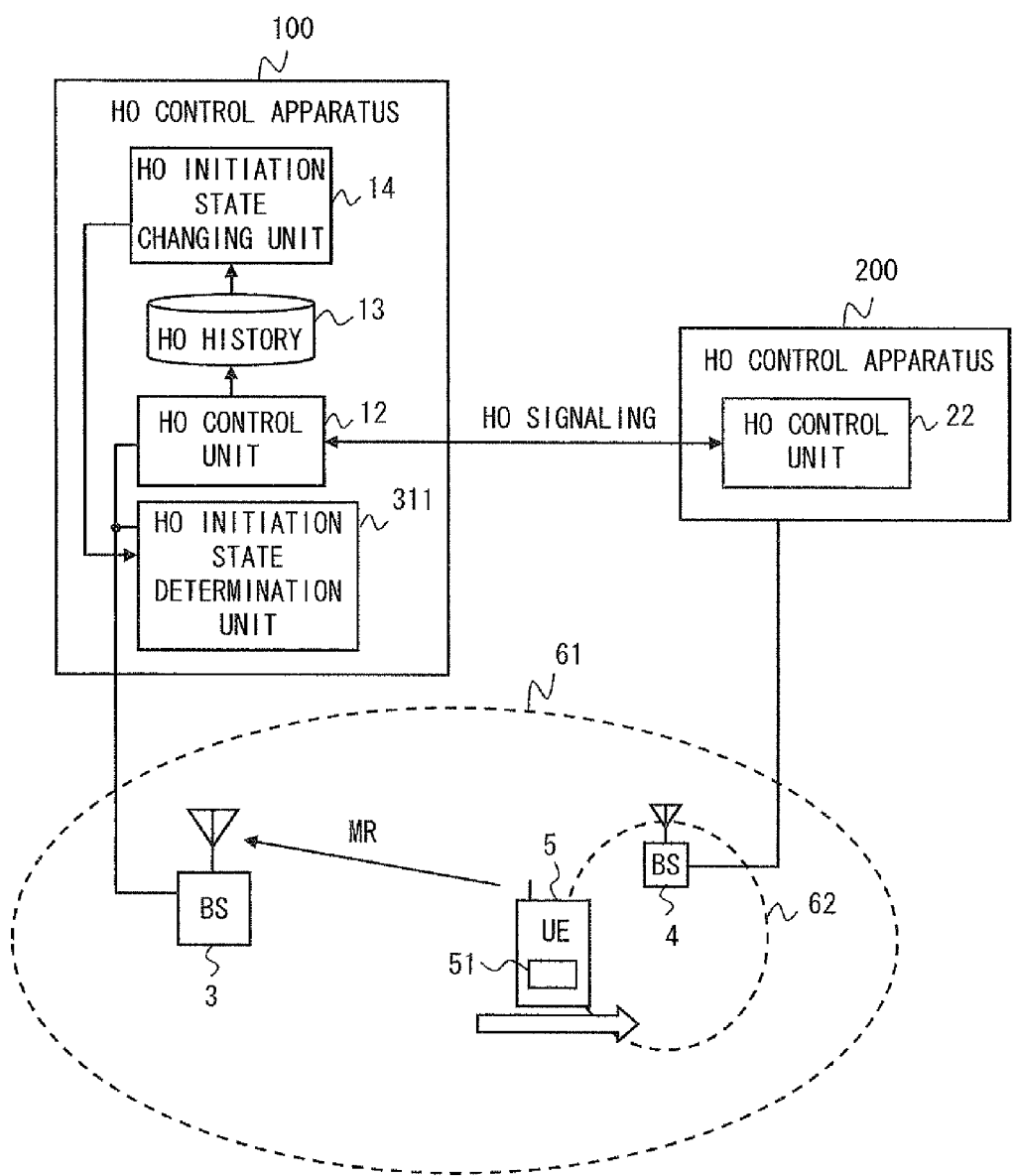
FIG. 11 is a diagram showing a configuration example of a cellular communication network according to a third embodiment.
Figure 12:
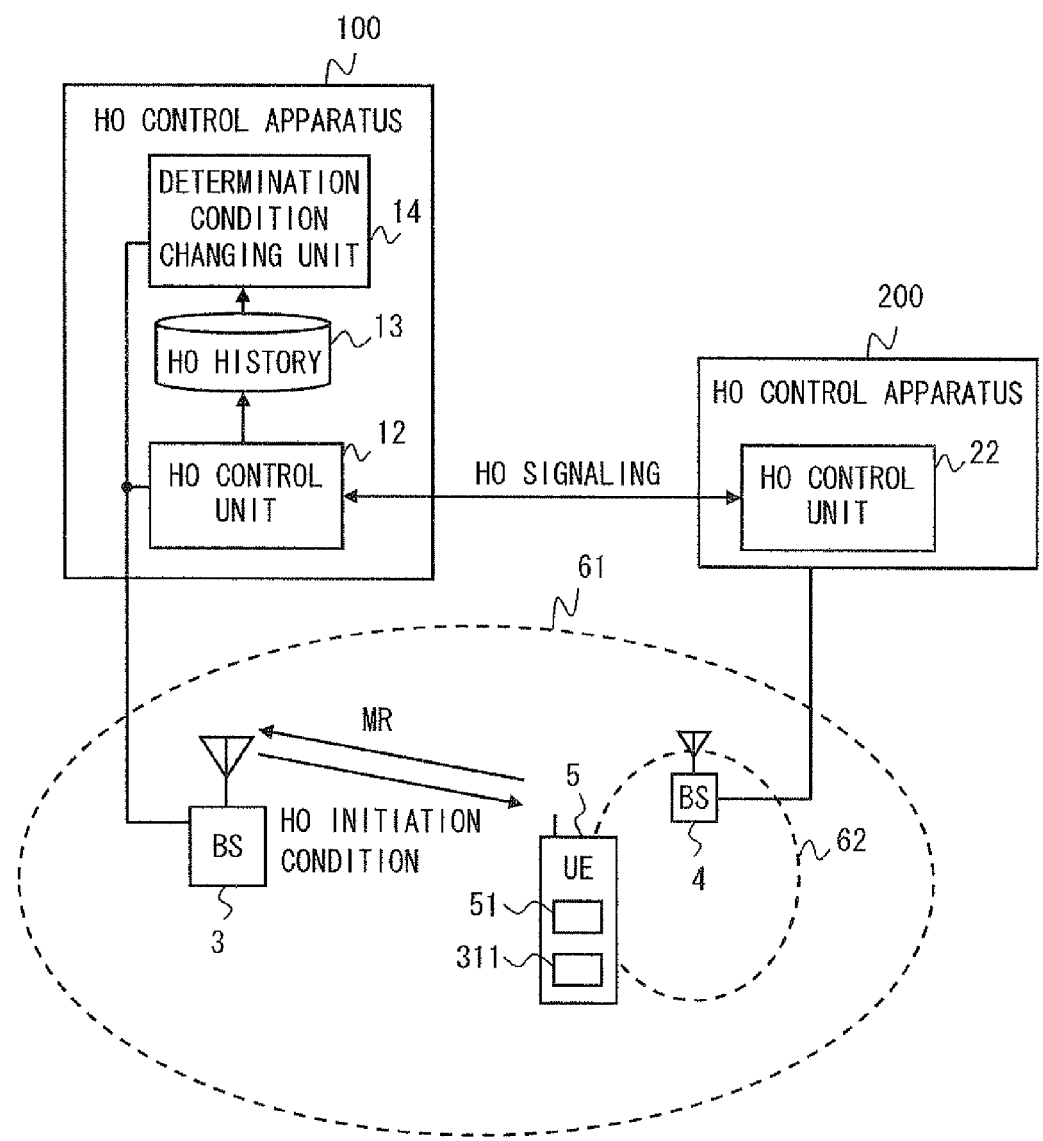
FIG. 12 is a diagram showing another configuration example of the cellular communication network according to the third embodiment.

In this embodiment, an alternative example of the first embodiment is described. FIG. 11 shows a configuration example of a network according to this embodiment. FIG. 11 describes a HO initiation state determination unit 311 in place of the HO initiation state determination unit 11 shown in FIGS. 1 to 3. Note that the HO initiation state determination unit 311 may be placed in the UE 5 as shown in FIG. 12.

The HO initiation state determination unit 311 according to this embodiment determines the first and second HO initiation states using the two HO initiation conditions and the two TTTs (TTT1 and TTT2) only when the handover performance between the serving cell 61 and the neighbour cell 62 are degraded. The degradation of handover performance may be determined based on that frequency of occurrence of handover failures (too late Handover, too early handover, handover to wrong cell) from the serving cell 61 to the neighbour cell 62, frequency of occurrence of ping-pong handover between the serving cell 61 and the neighbour cell 62 or frequency of occurrence of rapid handover due to staying a short time in the neighbour cell 62 exceeds a reference level. On the other hand, when the handover performance between the serving cell 61 and the neighbour cell 62 are good enough, a different method for determining the HO initiation state is used. For example, the HO initiation state determination unit 311 may perform determination of one HO initiation state (e.g., the first HO initiation state) only using one HO initiation condition and one TTT (e.g., the first HO initiation condition and TTT1) without making determination on the two HO initiation states using the two HO initiation conditions and two TTTs (TTT1 and TTT2).

A determination condition changing unit 14 determines degradation of handover performance between the serving cell 61 and the neighbour cell 62 by referring to HO history information 13. Depending on the presence or absence of degradation of handover performance between the cells 61 and 62, the determination condition changing unit 14 changes the determination condition for the HO initiation state (requirement for the HO initiation state) to be used by the HO initiation state determination unit 311.

The HO history information 13 may include the number of attempts for HO, the number of failures of HO, the occurrence history of ping-pong handover and rapid handover and the like. Instead of the occurrence history of ping-pong handover and rapid handover, information about the stay time of the UE in the neighbour cell 62 may be recorded. The number of attempts for HO may be obtained by counting the number of times of initiating handover from the serving cell 61 to the neighbour cell 62 by the HO control unit 12. The number of failures of HO may be obtained by counting the number of times of receiving a message indicating that handover from the serving cell 61 to the neighbour cell 62 has not completed, a message indicating that handover has been too early, or both of those messages from the HO control unit 22 on the neighbour cell side. Specifically, the number of times of receiving a Radio Link Failure Indication message, a Handover Report message and the like from the HO control unit 22 may be counted. Further, the occurrence history of ping-pong handover and rapid handover may be obtained by recording "UE visited cells history" that is provided from the HO control unit 22 to the HO control unit 12 when handover from the neighbour cell 62 to the serving cell 61 occurs. The occurrence history of ping-pong handover and rapid handover may be obtained by recording "UE visited cells history" that is provided from the UE to the HO control unit 12 when handover from the serving cell 61 to the neighbour cell 62 occurs. For example, in E-UTRAN, UE history information is sent from the HO control unit 22 to the HO control unit 12 as one of information about UE (UE context) when handover from the neighbour cell 62 to the serving cell 61 occurs. The UE history information contains a history of cells to which a UE has been connected, connected time and the like.

Figure 13:
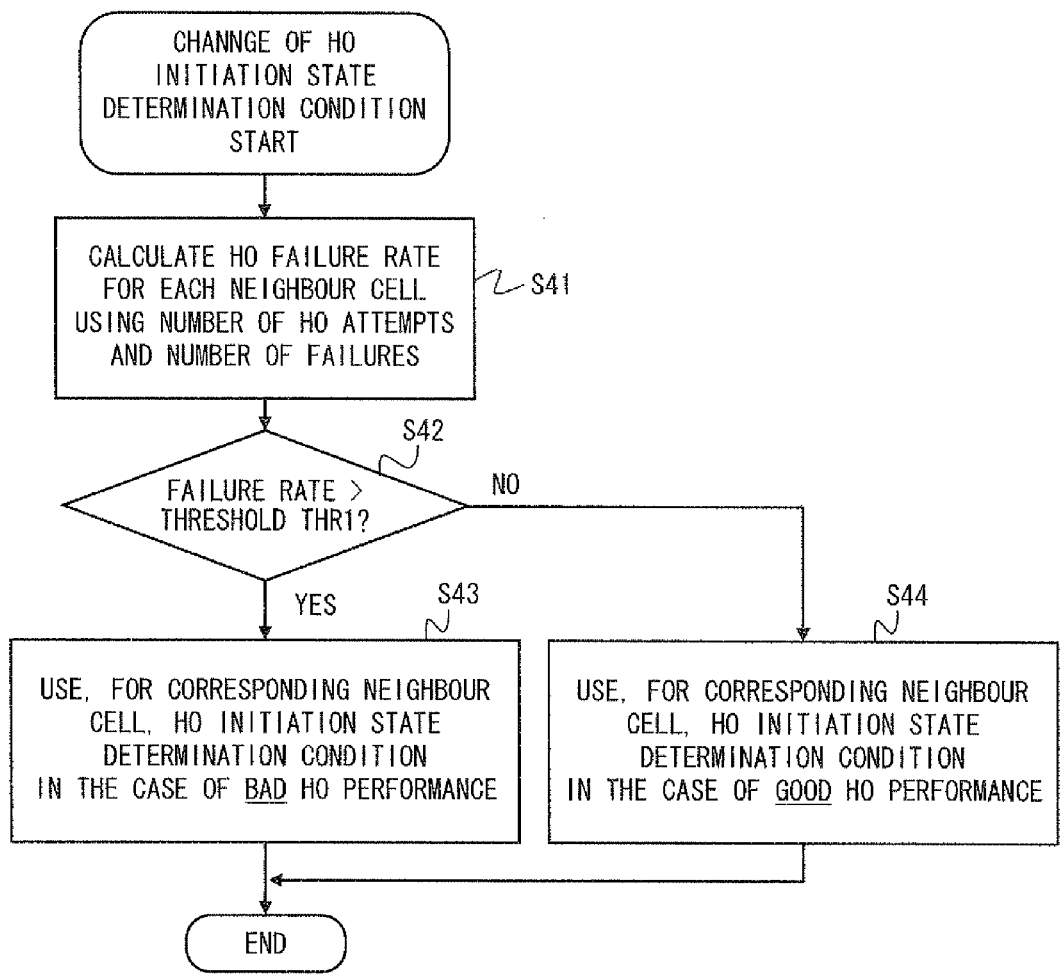
FIG. 13 is a flowchart showing a specific example of a method of changing a determination condition for a handover initiation state according to the third embodiment.

FIG. 13 is a flowchart showing a specific example of a procedure to change a HO initiation state determination condition according to this embodiment. In the example of FIG. 13, the case of changing HO initiation state determination condition using the frequency of HO failures (i.e., failure rate) as an index is shown. In Step S41, the determination condition changing unit 14 refers to the number of HO attempts and the number of HO failures stored in the HO history information 13 and calculates a HO failure rate for each of a plurality of neighbour cells including the neighbour cell 62. The HO failure rate may be calculated using the number of HO attempts and the number of HO failures for a predetermined counting period (e.g., the last one hour, the last one day, the last one week etc.)

In Step S42, the determination condition changing unit 14 determines whether the calculated HO failure rate is higher than a specified threshold THR1 for each of the neighbour cells. The determination condition changing unit 14 informs the HO initiation state determination unit 311 to use, in the determination on the neighbour cell where the HO failure rate is higher than the threshold THR1, HO initiation state determination condition in the case of bad handover performance (Step S43). Alternatively, the determination condition changing unit 14 informs the HO initiation state determination unit 311 to use, in the determination on the neighbour cell where the HO failure rate is equal to or less than the threshold THR1, HO initiation state determination condition in the case of good handover performance (Step S44).

According to this embodiment, when a change occurs in the handover performance between the serving cell 61 and the neighbour cell 62, HO initiation state determination condition which is suitable for the handover performance can be used automatically, thereby improving the handover performance.

Fourth Embodiment

Figure 14:
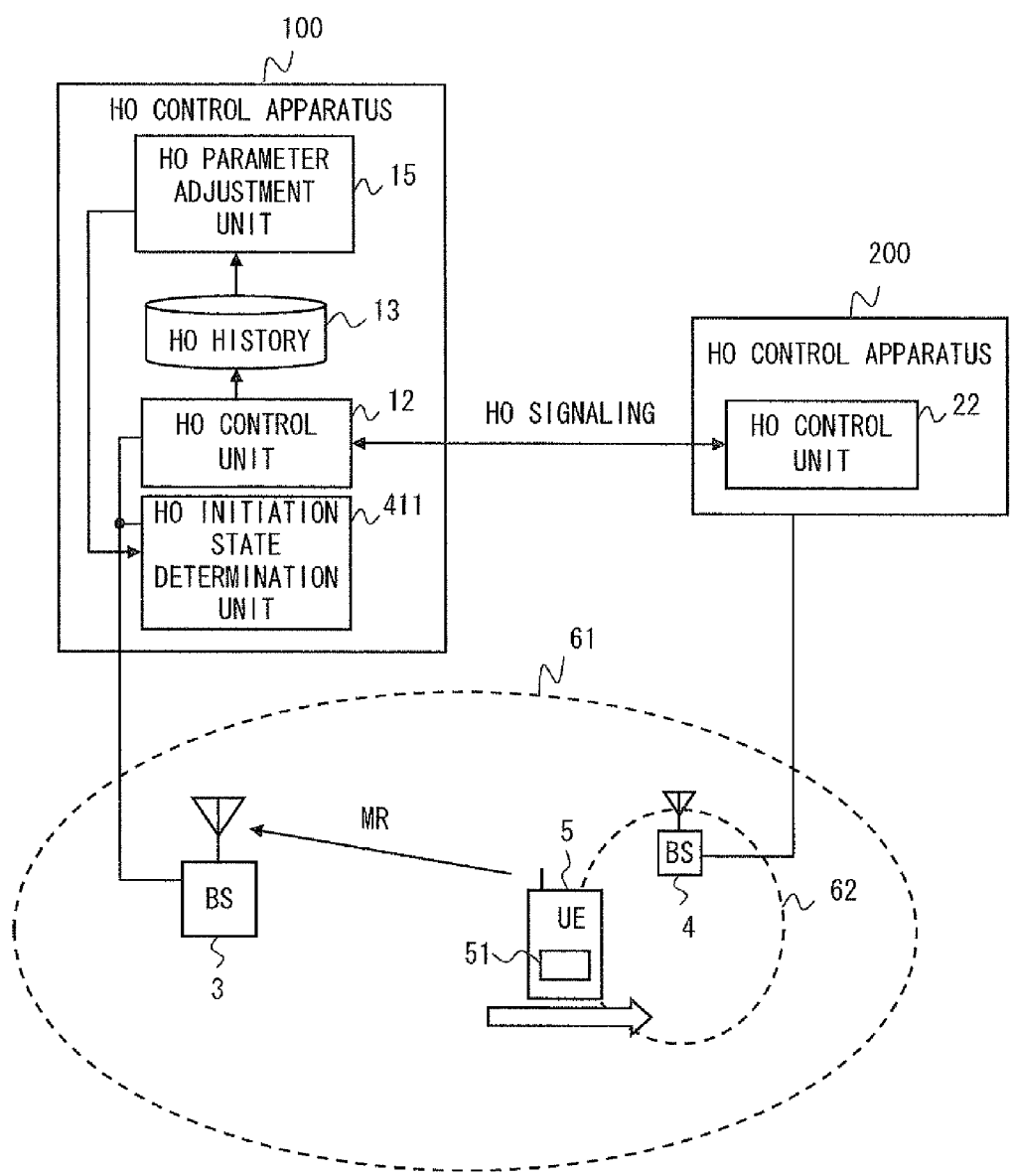
FIG. 14 is a diagram showing a configuration example of a cellular communication network according to a fourth embodiment.

In this embodiment, an alternative example of the first embodiment is described. FIG. 14 shows a configuration example of a network according to this embodiment. FIG. 11 describes a HO initiation state determination unit 411 in place of the HO initiation state determination unit 11 shown in FIGS. 1 to 3. Note that the HO initiation state determination unit 411 may be placed in the UE 5.

The HO initiation state determination unit 411 according to this embodiment adjusts at least one of TTT2 and threshold TH3 (or TH4) applied to the second HO initiation condition in accordance with frequency of occurrences of at least one of too early handover, ping-pong handover and rapid handover between the serving cell 61 and the neighbour cell 62. Specifically, as frequency of occurrences of at least one of too early handover, ping-pong handover and rapid handover increases, TTT2 may be adjusted longer or the threshold TH3 (or TH4) may be adjusted larger. Handover to the neighbour cell 62 of a UE that is moving at relatively high speed is suppressed, and thereby occurrence of too early handover, ping-pong handover and rapid handover can be reduced.

An HO parameter adjustment unit 15 refers to the HO history information 13 and then calculates frequency of occurrences of at least one of too early handover, ping-pong handover and rapid handover between the serving cell 61 and the neighbour cell 62. Further, the HO parameter adjustment unit 15 changes at least one of TTT2 and TH3 (TH4) applied to the HO initiation state determination unit 411 in accordance with the calculated frequency of occurrences.

Figure 15:
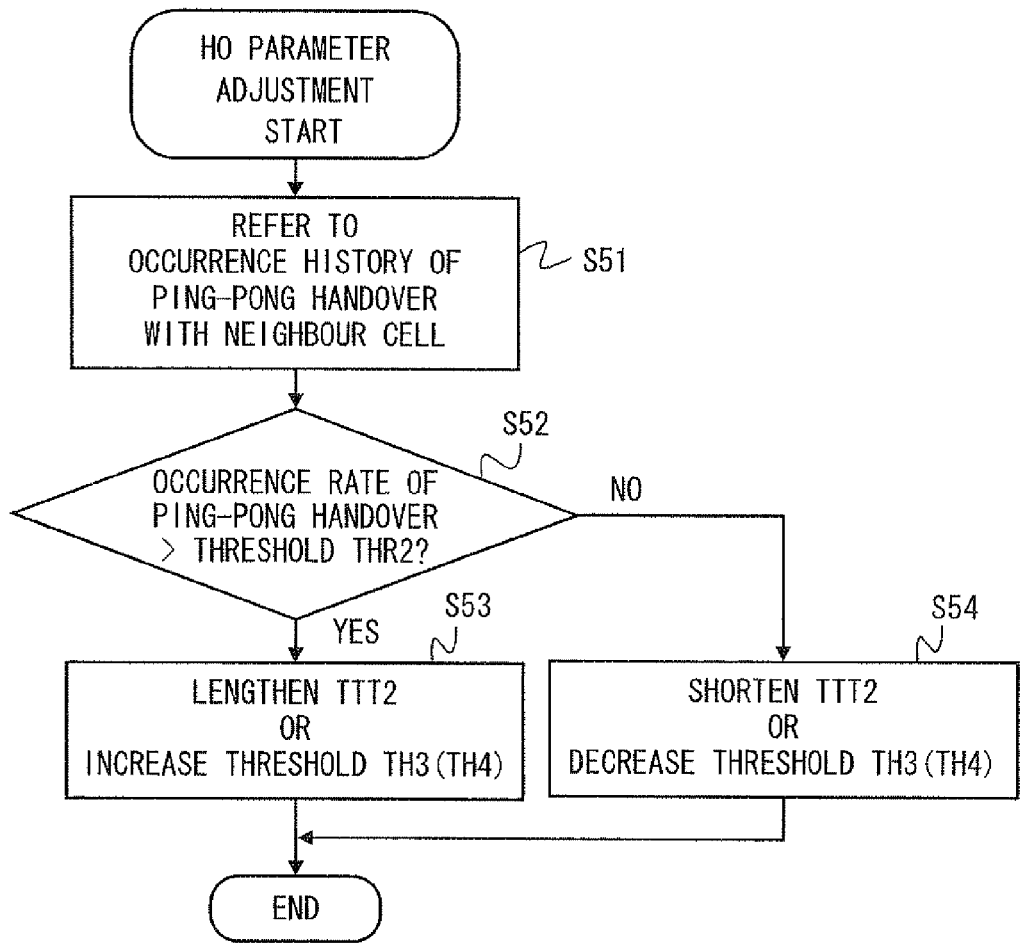
FIG. 15 is a flowchart showing a specific example of a method of adjusting a handover parameter according to the fourth embodiment.

FIG. 15 is a flowchart showing a specific example of a procedure to adjust a HO parameter according to this embodiment. Note that, although frequency of occurrences of ping-pong handover is taken into consideration in the example of FIG. 15, instead of this, frequency of occurrences of too early handover or rapid handover may be taken into consideration. Further, frequency of occurrences of all of ping-pong handover, rapid handover and too early handover may be taken into consideration. In Step S51, the HO parameter adjustment unit 15 refers to the occurrence history of ping-pong handover recorded in the HO history information 13 and then calculates a ratio of the number of occurrences of ping-pong handover between the serving cell 61 and the neighbour cell 62 to the total number of handovers (i.e., a rate of occurrence of ping-pong handover). In Step S52, the HO parameter adjustment unit 15 determines whether the rate of occurrence of ping-pong handover is higher than a specified threshold THR2. When the rate of occurrence of ping-pong handover is higher than the threshold THR2 (YES in Step S52), the HO parameter adjustment unit 15 adjusts TTT2 to be longer or the threshold TH3 (TH4) to be larger (Step S53). On the other hand, when the rate of occurrence of ping-pong handover is equal to or lower than the threshold THR2 (NO in Step S52), the HO parameter adjustment unit 15 adjusts TTT2 to be shorter or the threshold TH3 (TH4) to be smaller (Step S54).

Note that, when a TTT2 or TH3 (TH4) can be adjusted for each of neighbour cells individually, the HO parameter adjustment unit 15 may calculate frequency of occurrences of at least one of too early handover and ping-pong handover for each of neighbour cells and adjust TTT2 or TH3 (TH4) for each neighbour cell individually.

According to this embodiment, TTT2 or TH3 (TH4) is adjusted to be larger when frequency of occurrences of at least one of too early handover, ping-pong handover and rapid handover is high, so that the handover to the neighbour cell 62 of a UE that is moving at relatively high speed is suppressed, and thereby occurrence of too early handover, ping-pong handover and rapid handover can be reduced.

Fifth Embodiment

In this embodiment, an alternative example of the first embodiment is described. A configuration example of a network according to this embodiment may be the same as that according to the fourth embodiment shown in FIG. 14. In this embodiment, a threshold TH1 to be applied to the first HO initiation condition is changed in accordance with frequency of occurrences of handover failure from the serving cell 61 to the neighbour cell 62. Specifically, the threshold TH1 may be adjusted larger as frequency of occurrences of handover failure (too late HO) increases. This allows handover to the neighbour cell 62 to be initiated promptly before radio quality of the serving cell 61 at the position of the UE 5 is significantly degraded, thereby reducing occurrence of handover failure (i.e., too late HO).

Figure 16:
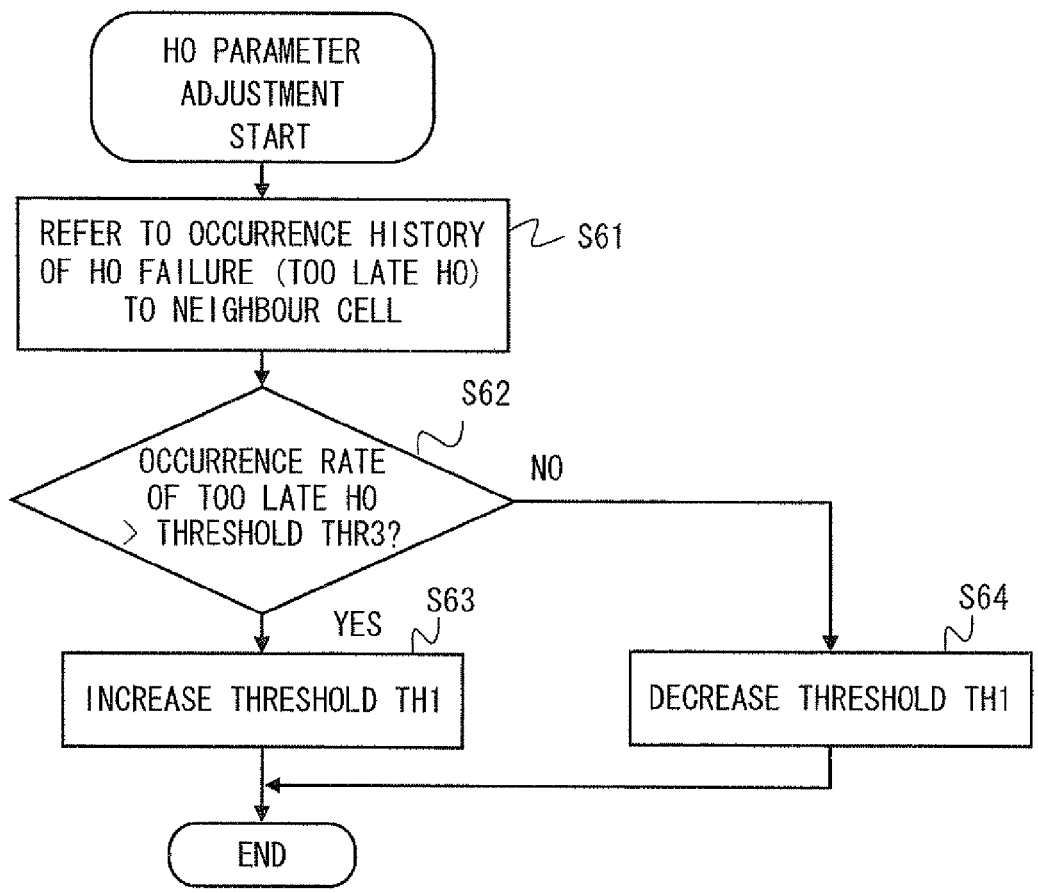
FIG. 16 is a flowchart showing a specific example of a method of adjusting a handover parameter according to a fifth embodiment.

FIG. 16 is a flowchart showing a specific example of a procedure to adjust a HO parameter according to this embodiment. In Step S61, the HO parameter adjustment unit 15 refers to occurrence history of handover failure (i.e., too late HO) recorded in the HO history information 13 and calculates a ratio of the number of occurrences of too late handover from the serving cell 61 to the neighbour cell 62 to the total number of handovers (i.e., a rate of occurrence of too late handover). In Step S62, the HO parameter adjustment unit 15 determines whether the rate of occurrence of too late handover is higher than a specified threshold THR3. When the rate of occurrence of too late handover is higher than the threshold THR3 (YES in Step S62), the HO parameter adjustment unit 15 adjusts the threshold TH1 to be larger (Step S63). On the other hand, when the rate of occurrence of too late handover is equal to or lower than the threshold THR3 (NO in Step S62), the HO parameter adjustment unit 15 adjusts the threshold TH1 to be smaller (Step S64).

Note that, when a TH1 can be adjusted for each of neighbour cells individually, the HO parameter adjustment unit 15 may calculate frequency of occurrences of handover failure for each of neighbour cells and adjust TH1 for each neighbour cell individually.

According to this embodiment, TH1 is adjusted to be larger when frequency of occurrences of handover failure (i.e., too late HO) is high, so that the handover to the neighbour cell 62 is initiated promptly, and thereby occurrence of handover failure (i.e., too late handover) can be reduced.

Sixth Embodiment

Figure 17:
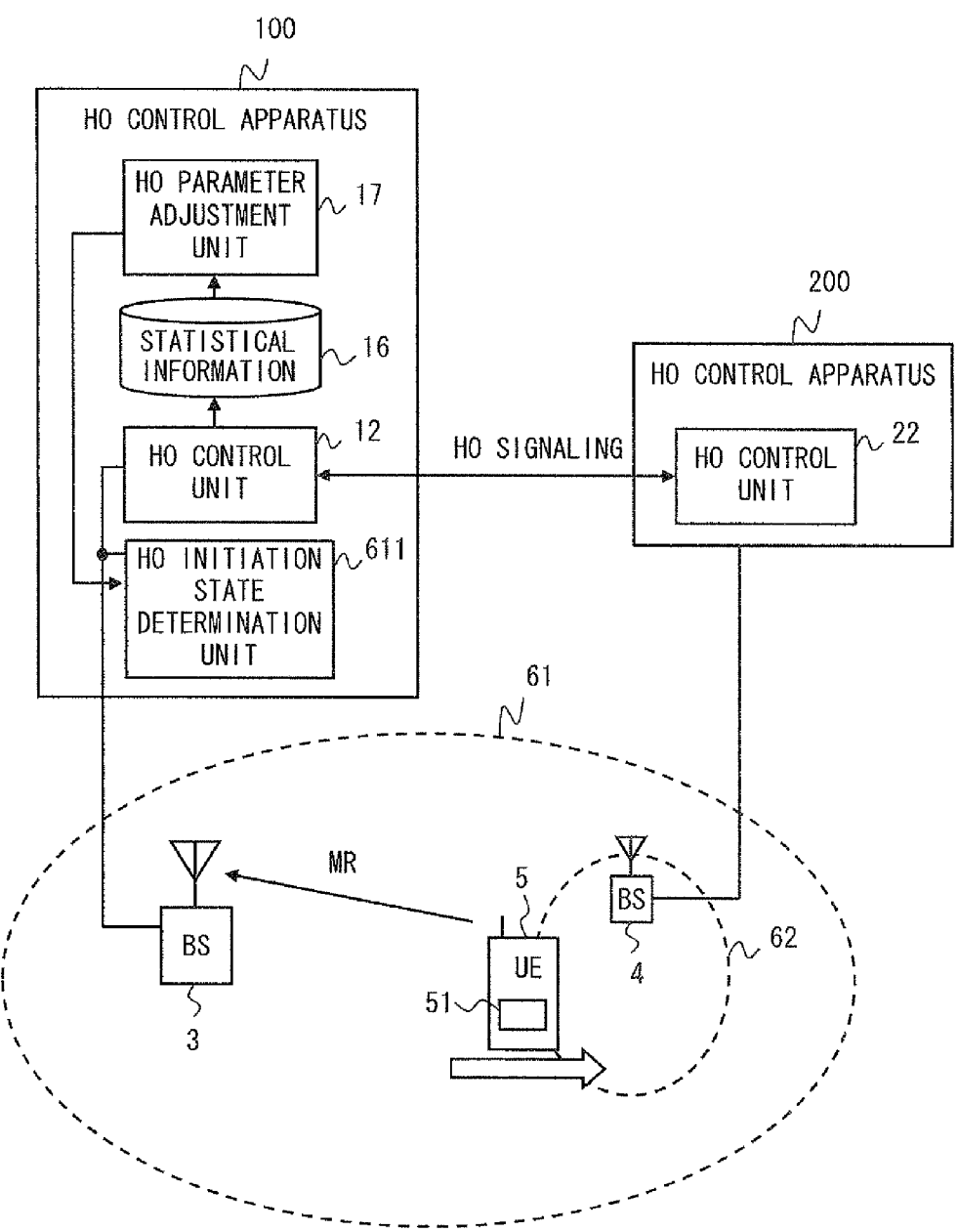
FIG. 17 is a diagram showing a configuration example of a cellular communication network according to a sixth embodiment.

In this embodiment, an alternative example of the first embodiment is described. FIG. 17 shows a configuration example of a network according to this embodiment. FIG. 17 describes a HO initiation state determination unit 611 in place of the HO initiation state determination unit 11 shown in FIGS. 1 to 3. The HO initiation state determination unit 611 may be placed in the UE 5. The HO initiation state determination unit 611 according to this embodiment adjusts TTT2 to be applied to the second HO initiation condition in accordance with an instruction from a HO parameter adjustment unit 17.

The HO parameter adjustment unit 17 adjusts TTT2 to be applied to the second HO initiation condition so that substantially a certain proportion of UEs passing through the neighbour cell 62 perform handover to the neighbour cell 62 based on statistical information 16 indicating the stay time of UE in the neighbour cell 62. The statistical information 16 indicating the stay time of UE in the neighbour cell 62 may be acquired from a report from the UE 5 that connects to the serving cell 61. Further, the statistical information 16 may be acquired by signaling with the base station 4 that manages the neighbour cell 62 or signaling with the HO control apparatus 200. Furthermore, the statistical information 16 may be acquired from EMS or NMS of a telecommunications carrier.

Figure 18:
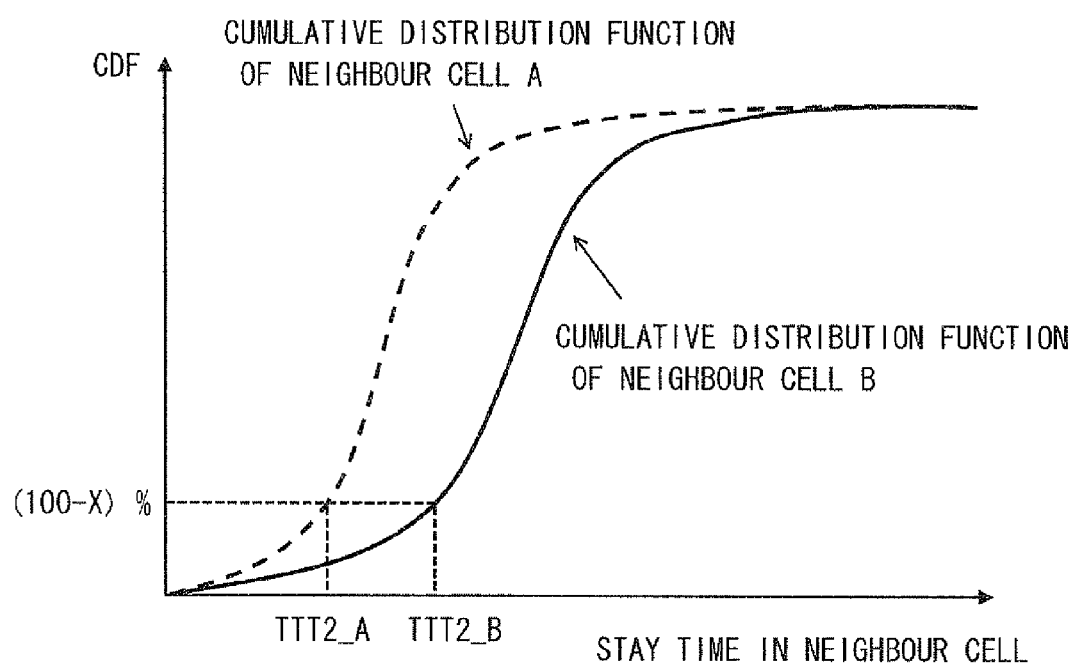
FIG. 18 is a graph showing an example of cumulative distribution function (CDF) of stay time of a mobile station in a neighbour cell.

The graph of FIG. 18 shows two examples of cumulative distribution function (CDF) of the stay time of UE in neighbour cells. The CDF of neighbour cell A indicated by the dashed line shows an example in which average moving speed of UE is high and average stay time in the neighbour cell is short. On the other hand, the CDF of neighbour cell B indicated by the solid line shows the example in which average moving speed of UE is low and average stay time in the neighbour cell is long. The HO parameter adjustment unit 17 adjusts TTT2 so that substantially X percent (e.g., 95 percent) of UEs among a plurality of UEs passing through the neighbour cell 62 perform handover to the neighbour cell 62. As the simplest way, the stay time of UE corresponding to (100−X) percent from the one with the shortest stay time in the CDF shown in FIG. 18 may be set as TTT2. Note that the value of TTT2 may be further adjusted in consideration of average time required from start to end of handover. In the example of FIG. 18, a relatively small TTT2_A is used for the neighbour cell A where the average moving speed of UE is high, and a relatively large TTT2_B is used for the neighbour cell B where the average moving speed of UE is low.

Figure 19:
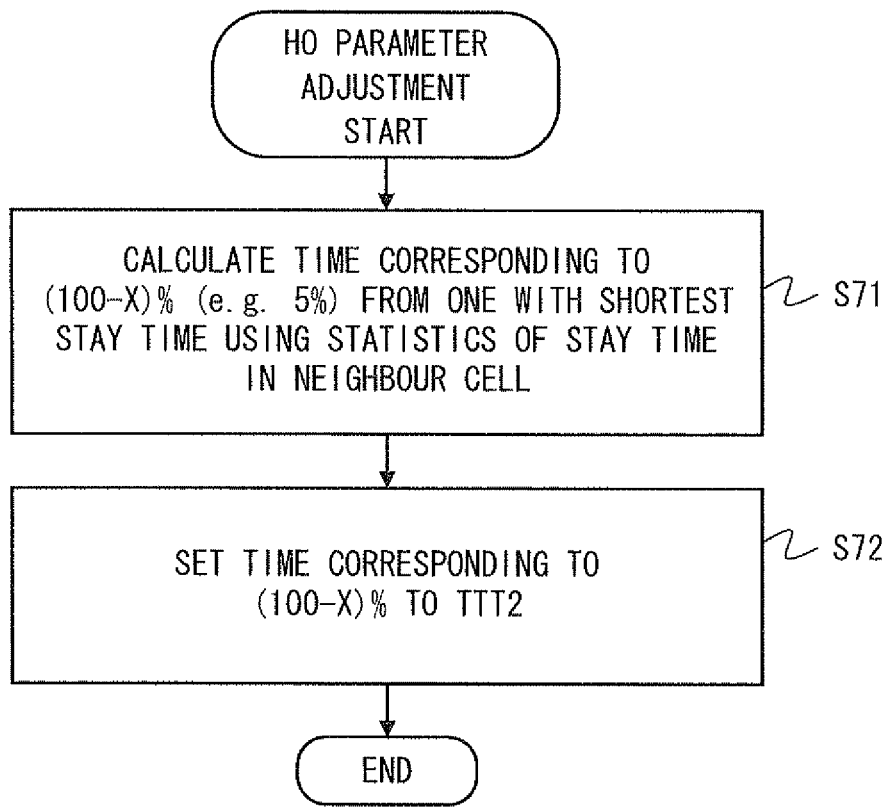
FIG. 19 is a flowchart showing a specific example of a method of adjusting a handover parameter according to a sixth embodiment.

FIG. 19 is a flowchart showing a specific example of a procedure to adjust a HO parameter according to this embodiment. In Step S71, the HO parameter adjustment unit 17 calculates the time corresponding to (100−X) percent from the one with the shortest stay time by using statistics of stay time in the neighbour cell 62. In Step S72, the HO parameter adjustment unit 17 sets the obtained time corresponding to (100−X) percent as TTT2. As described above, the HO parameter adjustment unit 17 may set, as TTT2, a value obtained by adjusting the time corresponding to (100-X) percent in consideration of average time required from start to end of handover.

According to this embodiment, the situation where handover to the neighbour cell 62 hardly occurs due to too long TTT2 can be avoided. Thus, this embodiment efficiently achieves load sharing by offloading traffic of the serving cell 61 to the neighbour cell 62, provision of a high-speed service by the neighbour cell 62 and the like.

Other Embodiments

Although the second to sixth embodiments are described as alternative examples of the first embodiment, the second to sixth embodiments may be combined as appropriate.

The determination of the HO initiation state, the change of a HO initiation state determination condition and the adjustment of a HO parameter described in the first to sixth embodiments may be implemented using a semiconductor processing device such as ASIC (Application Specific Integrated Circuit) or DSP (Digital Signal Processor). Alternatively, these processes may be implemented by causing a computer such as a microprocessor to execute a program. Specifically, a program containing a set of instructions that cause a computer to execute the algorithm shown in at least one of FIGS. 4, 6, 7, 10, 13, 15, 16 and 19 may be created, and the program may be supplied to the computer.

The program can be stored and provided to the computer using any type of non-transitory computer readable medium. The non-transitory computer readable medium includes any type of tangible storage medium. Examples of the non-transitory computer readable medium include magnetic storage media (e.g., floppy disks, magnetic tapes, hard disk drives, etc.), optical magnetic storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Moreover, the present invention is not limited only to the embodiments described above, but can be modified in various manners without departing from the gist of the present invention described above.

This application is based upon and claims the benefit of priority from Japanese patent application No. 2010-291498, filed on Dec. 28, 2010, the disclosure of which is incorporated herein in its entirety by reference.

REFERENCE SIGNS LIST

3 BASE STATION
4 BASE STATION
5 MOBILE STATION
11 HANDOVER (HO) INITIATION STATE DETERMINATION UNIT
12 HANDOVER (HO) CONTROL UNIT
13 HANDOVER (HO) HISTORY INFORMATION
14 DETERMINATION CONDITION CHANGING UNIT
15 HANDOVER (HO) PARAMETER ADJUSTMENT UNIT
16 STATISTICAL INFORMATION
17 HANDOVER (HO) PARAMETER ADJUSTMENT UNIT
22 HANDOVER (HO) CONTROL UNIT
51 SENDING UNIT
61 SERVING CELL
62 NEIGHBOUR CELL
71 RNC (RADIO NETWORK CONTROLLER)
72 RNC (RADIO NETWORK CONTROLLER)
100 HANDOVER (HO) CONTROL APPARATUS
200 HANDOVER (HO) CONTROL APPARATUS
211 HANDOVER (HO) INITIATION STATE DETERMINATION UNIT
311 HANDOVER (HO) INITIATION STATE DETERMINATION UNIT
411 HANDOVER (HO) INITIATION STATE DETERMINATION UNIT
611 HANDOVER (HO) INITIATION STATE DETERMINATION UNIT

What is claimed is:

1. A handover control method for handover of a mobile station from a first cell to a second cell, comprising:
   initiating the handover in response to satisfaction of a first state in which a period during which a first handover initiation condition continues to be satisfied is longer than a first hold time, wherein the first handover initiation condition is used when a radio quality of the first cell at a position of the mobile station is equal to or lower than a first level; and
   initiating the handover in response to satisfaction of a second state in which a period during which a second handover initiation condition continues to be satisfied is longer than a second hold time, wherein the second handover initiation condition is used when the radio quality of the first cell at the position of the mobile station is equal to or greater than a second level,
   wherein the second hold time is longer than the first hold time and the second level is higher than the first level.

2. The handover control method according to claim 1, wherein
   the first handover initiation condition further comprises the radio quality of the first cell being lower than a first threshold and a radio quality of the second cell being higher than a second threshold, and
   the second handover initiation condition further comprises the radio quality of the second cell being higher than a third threshold.

3. The handover control method according to claim 2, wherein the second threshold is the same as the third threshold.

4. The handover control method according to claim 2, wherein determination of the first state and the second state using the first hold time and the second hold time is performed by a handover control entity of the first cell based on a measurement report about a measurement result of the radio quality of the second cell from the mobile station.

5. The handover control method according to claim 4, wherein the measurement report is sent periodically from the mobile station to the handover control entity.

6. The handover control method according to claim 4, wherein the handover control entity of the first cell is a base station that manages the first cell or a radio network controller placed in an upper network to which the base station device is connected.

7. The handover control method according to claim 2, wherein determination of the first state and the second state using the first hold time and the second hold time is performed by the mobile station.

8. The handover control method according to claim 7, further comprising initiating, by a handover control entity of the first cell, signaling for the handover with a handover control entity of the second cell in response to a notification from the mobile station that the first or second state is determined to be satisfied.

9. The handover control method according to claim 8, wherein the notification includes a measurement report about a measurement result of the radio quality of the second cell.

10. The handover control method according to claim 2, further comprising adjusting the first threshold to be larger than a past value, based on a history of the handover, so as to reduce frequency of occurrences of too late handover from the first cell to the second cell.

11. The handover control method according to claim 2, wherein the handover initiation control based on the first and second states is performed only when a frequency of occurrences of at least one of handover failure from the first cell to the second cell, ping-pong handover and rapid handover exceeds a reference level.

12. The handover control method according to claim 2, wherein
when a frequency of occurrences of at least one of handover failure from the first cell to the second cell, ping-pong handover and rapid handover exceeds a reference level, the handover initiation control based on the first and second states is performed, and
when the frequency of occurrences is lower than the reference level, handover initiation control different from that in the case of the frequency of occurrences exceeding the reference level is performed.

13. The handover control method according to claim 2, wherein the handover initiation control based on the first and second states is performed only when the second cell is a small-scale cell having smaller coverage than the first cell.

14. The handover control method according to claim 1, wherein
the first handover initiation condition further comprises the radio quality of the first cell being lower than a first threshold and a radio quality of the second cell being higher than a second threshold, and
the second handover initiation condition further comprises the radio quality of the second cell being higher than the radio quality of the first cell by more than a fourth threshold.

15. The handover control method according to claim 1, further comprising adjusting the second hold time to be longer than a past value, based on a history of the handover, so as to reduce frequency of occurrences of at least one of too early handover, ping-pong handover and rapid handover between the first cell and the second cell.

16. The handover control method according to claim 1, further comprising adjusting the second hold time so that a certain proportion of mobile stations passing through the second cell performs handover to the second cell based on statistical information of stay time of mobile stations in the second cell.

17. A control apparatus comprising:
a determination unit configured to determine a handover initiation state serving as a trigger to initiate handover of a mobile station from a first cell to a second cell, wherein
the determination unit is configured to determine satisfaction of the handover initiation state in response to satisfaction of a first state in which a period during which a first handover initiation condition continues to be satisfied is longer than a first hold time, wherein the first handover initiation condition is used when a radio quality of the first cell at a position of the mobile station is equal to or lower than a first level, and
the determination unit is also configured to determine satisfaction of the handover initiation state in response to satisfaction of a second state in which a period during which a second handover initiation condition continues to be satisfied is longer than a second hold time, wherein the second handover initiation condition is used when the radio quality of the first cell at the position of the mobile station is equal to or greater than a second level, wherein the second hold time is longer than the first hold time and the second level is higher than the first level.

18. The control apparatus according to claim 17, wherein
the first handover initiation condition further comprises the radio quality of the first cell being lower than a first threshold and a radio quality of the second cell being higher than a second threshold, and
the second handover initiation condition further comprises the radio quality of the second cell being higher than a third threshold.

19. The control apparatus according to claim 18, wherein the second threshold is the same with the third threshold.

20. The control apparatus according to claim 18, wherein the handover initiation control by the determination unit based on the first and second states is performed only when a frequency of occurrences of at least one of handover failure from the first cell to the second cell, ping-pong handover and rapid handover exceeds a reference level.

21. The control apparatus according to claim 18, wherein
when a frequency of occurrences of at least one of handover failure from the first cell to the second cell, ping-pong handover and rapid handover exceeds a reference level, the determination unit performs the handover initiation control based on the first and second states, and
when the frequency of occurrences is lower than the reference level, the determination unit performs handover initiation control different from that in the case of the frequency of occurrences exceeding the reference level.

22. The control apparatus according to claim 18, wherein the handover initiation control by the determination unit based on the first and second states is performed only when the second cell is a small-scale cell having smaller coverage than the first cell.

23. The control apparatus according to claim 17, wherein
the first handover initiation condition further comprises a first condition including the radio quality of the first cell being lower than a first threshold and a radio quality of the second cell being higher than a second threshold, and
the second handover initiation condition further comprises the radio quality of the second cell being higher than radio quality of the first cell by more than a fourth threshold.

24. The control apparatus according to claim 17, wherein the control apparatus is placed in a handover control entity of the first cell.

25. The control apparatus according to claim 17, wherein
the control apparatus is placed in the mobile station, and
the control apparatus further comprises a sending unit configured to send, to a handover control entity of the first cell, a notification used as a trigger for the handover in response to determination of the handover initiation state.

26. The control apparatus according to claim 25, wherein the notification includes a measurement report about a measurement result of a radio quality of the second cell.

27. An adjustment apparatus, used in combination with the control apparatus according to claim 17, and configured to adjust the handover parameter based on at least one of a history of the handover and statistical information of stay time of mobile stations in the second cell.

28. The adjustment apparatus according to claim 27, wherein
the adjustment apparatus comprises a parameter adjustment unit configured to adjust the second hold time to be longer than a past value, based on the history of the handover, so as to reduce frequency of occurrences of at least one of too early handover, ping-pong handover and rapid handover between the first cell and the second cell.

29. The adjustment apparatus according to claim 27, wherein the first handover initiation condition further comprises the radio quality of the first cell being lower than a first threshold and a radio quality of the second cell being higher than a second threshold, and the second handover initiation condition further comprises the radio quality of the second cell being higher than a third threshold, and the adjustment apparatus comprises a parameter adjustment unit configured to adjust the third threshold to be larger than a past value, based on the history of the handover, so as to reduce frequency of occurrences of at least one of too early handover, ping-pong handover and rapid handover between the first cell and the second cell.

30. The adjustment apparatus according to claim 27, wherein the first handover initiation condition further comprises the radio quality of the first cell being lower than a first threshold and a radio quality of the second cell being higher than a second threshold, and the second handover initiation condition further comprises the radio quality of the second cell being higher than a third threshold, and the adjustment apparatus comprises a parameter adjustment unit configured to adjust the first threshold to be larger than a past value, based on the history of the handover, so as to reduce frequency of occurrences of too late handover from the first cell to the second cell.

31. The adjustment apparatus according to claim 27, wherein the adjustment apparatus comprises a parameter adjustment unit configured to adjust the second hold time so that a certain proportion of mobile stations passing through the second cell performs handover to the second cell based on statistical information of stay time of mobile stations in the second cell.

32. A non-transitory computer readable medium storing a program causing a computer to perform initiation control for handover of a mobile station from a first cell to a second cell, the initiation control comprising:

determining satisfaction of a handover initiation state serving as a trigger to initiate the handover, in response to satisfaction of a first state in which a period during which a first handover initiation condition continues to be satisfied is longer than a first hold time, wherein the first handover initiation condition is used when a radio quality of the first cell at a position of the mobile station is equal to or lower than a first level, and determining satisfaction of the handover initiation state in response to satisfaction of a second state in which a period during which a second handover initiation condition continues to be satisfied is longer than a second hold time, wherein the second handover initiation condition is used when the radio quality of the first cell at the position of the mobile station is equal to or greater than a second level, wherein the second hold time is longer than the first hold time and the second level is higher than the first level.

* * * * *